United States Patent
Yoo et al.

(10) Patent No.: US 7,405,798 B2
(45) Date of Patent: Jul. 29, 2008

(54) LIQUID CRYSTAL DISPLAY APPARATUS AND METHOD OF FORMING THE SAME

(75) Inventors: Young-Hoon Yoo, Suwon-si (KR); Jang-Soo Kim, Suwon-si (KR); Hye-Young Ryu, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/768,333

(22) Filed: Jan. 30, 2004

(65) Prior Publication Data
US 2004/0227895 A1 Nov. 18, 2004

(30) Foreign Application Priority Data
May 15, 2003 (JP) ............. 10-2003-0030790

(51) Int. Cl.
*G02F 1/1339* (2006.01)
*G02F 1/1345* (2006.01)

(52) U.S. Cl. .............. 349/153; 349/149; 349/155
(58) Field of Classification Search ........... 349/155, 349/153, 149
See application file for complete search history.

(56) References Cited

U.S. PATENT DOCUMENTS

| | | | | |
|---|---|---|---|---|
| 4,469,410 A | * | 9/1984 | Ikesue | 349/153 |
| 4,600,273 A | * | 7/1986 | Ohno | 349/155 |
| 5,556,670 A | * | 9/1996 | Mihara et al. | 428/1.5 |
| 5,943,107 A | | 8/1999 | Kadota et al. | |
| 5,946,057 A | * | 8/1999 | Kusanagi | 349/40 |
| 5,978,061 A | | 11/1999 | Miyazaki et al. | |
| 6,335,779 B1 | * | 1/2002 | Morii et al. | 349/155 |
| 6,392,735 B1 | * | 5/2002 | Tani | 349/156 |
| 6,400,438 B1 | * | 6/2002 | Noritake et al. | 349/149 |
| 6,636,192 B1 | * | 10/2003 | Saitoh | 345/87 |

FOREIGN PATENT DOCUMENTS

CN 1400500 3/2003

* cited by examiner

*Primary Examiner*—James A Dudek
(74) *Attorney, Agent, or Firm*—F. Chau & Associates, LLC

(57) ABSTRACT

A liquid crystal display device including a first substrate, a common electrode formed over the first substrate, and a second substrate disposed opposite the first substrate. A common voltage-applying member applies a common voltage to the common electrode and maintains a cell gap between the first substrate and the second substrate. The common voltage-applying member includes an insulator and a conductor formed over the insulator.

5 Claims, 24 Drawing Sheets

LIQUID CRYSTAL DISPLAY APPARATUS AND METHOD OF FORMING THE SAME

CROSS-REFERENCE TO RELATED APPLICATION

This application claims priority based on Korean Patent Application No. 2003-30790 filed on May 15, 2003.

BACKGROUND

1. Technical Field

The present disclosure relates to a liquid crystal display (LCD) apparatus, and more particularly to an LCD apparatus manufactured by a simplified process and at low cost.

2. Description of the Related Art

A conventional LCD apparatus displays an image using liquid crystal. In order to display the image, the conventional LCD apparatus includes an LCD panel and a backlight assembly for supplying light to the LCD panel. The LCD panel includes a first substrate, a second substrate and liquid crystal interposed between the first and second substrates.

The first substrate includes a plurality of first electrodes and the second substrate includes a second electrode facing the first electrodes. Each of the first electrodes receives a pixel voltage different from each other and the second electrode receives a common voltage having a uniform voltage level. The arrangement of the liquid crystal is varied according to an electric field applied between the first and second electrodes.

The pixel voltage and common voltage are applied to the first substrate. The pixel voltage is applied to the first electrodes and the common voltage applied to the first substrate is provided to the second substrate through a conductive spacer that is electrically connected between the first and second substrates. The conventional conductive spacer is typically formed of gold (Au) and is formed at many locations of the first substrate.

In a manufacturing processes for an LCD apparatus in which a common voltage from a first substrate is applied to a second substrate through a conductive spacer, much time is required to form the conductive spacer. For example, in a conventional manufacturing process, a common electrode and color filters are formed over a substrate of an LCD panel, and separate manufacturing steps are required to form the conductive spacer over the color filters and the common electrode. These additional manufacturing steps increase manufacturing time of the conventional LCD apparatus and require more raw materials. Also, because the conventional conductive spacer is made of gold (Au), manufacturing cost for the LCD apparatus may be high.

SUMMARY OF THE INVENTION

According to various exemplary embodiments of the present invention, a common voltage applied to a first substrate of an LCD apparatus is provided to a common electrode formed over a second substrate through a conductor formed over an insulator. Thus, the manufacturing processes for the LCD apparatus may be simplified and the manufacturing cost for the LCD apparatus may be reduced.

A liquid crystal display device according to an embodiment of the invention includes a first substrate, a common electrode formed over the first substrate, and a second substrate disposed opposite the first substrate. A common voltage-applying member applies a common voltage to the common electrode and maintains a cell gap between the first substrate and the second substrate. The common voltage-applying member includes an insulator and a conductor formed over the insulator.

In at least one embodiment of the invention, a color filter is formed over one of the first and second substrates. The color filter and the insulator are formed simultaneously and of the same material.

In at least one embodiment of the invention, the common electrode and the conductor are formed simultaneously and of the same material.

In at least one embodiment of the invention, a plurality of pixel electrodes are formed over the second substrate, and the plurality of pixel electrodes and the conductor are formed simultaneously and of the same material.

A method of forming a liquid crystal display device according to an embodiment of the invention includes forming a common electrode over a first substrate, disposing a second substrate opposite the first substrate, forming an insulator over one of the first substrate and the second substrate, and forming a conductor over the insulator. The insulator and the conductor form a common voltage-applying member that applies a common voltage to the common electrode and that maintains a cell gap between the first substrate and the second substrate.

BRIEF DESCRIPTION OF THE DRAWINGS

The present invention will become readily apparent by describing preferred embodiments thereof in detail with reference to the accompanying drawings wherein.

DESCRIPTION OF PREFERRED EMBODIMENTS

Figure 1:
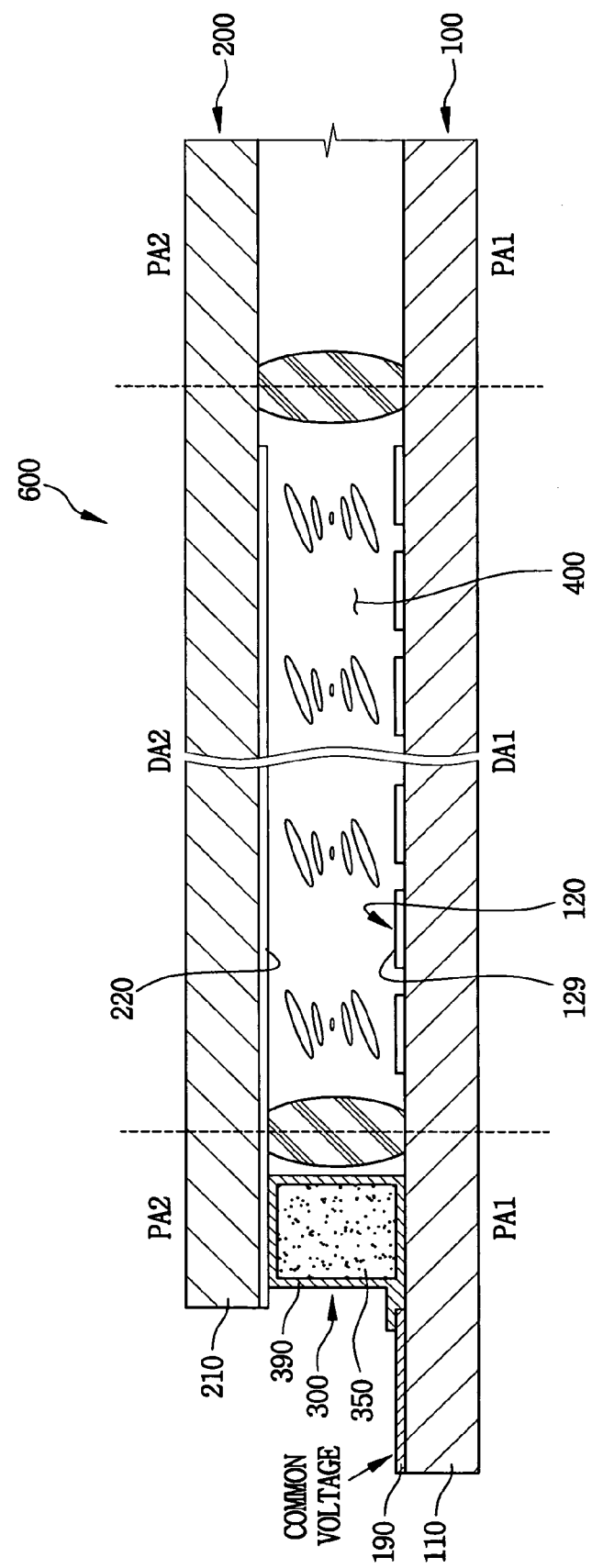
FIG. 1 is a schematic view of an LCD apparatus according to an exemplary embodiment of the present invention.

FIG. 1 is a schematic view showing an LCD apparatus according to an exemplary embodiment of the present invention.

Referring to FIG. 1, an LCD apparatus 600 according to the present embodiment of the invention includes a first substrate 100, a second substrate 200, a common voltage-applying member 300 and liquid crystal 400. The first substrate 100 faces the second substrate 200, and the common voltage-applying member 300 and the liquid crystal 400 are disposed between the first and second substrates 100 and 200.

The first substrate 100 includes a first transparent substrate 110 and a plurality of pixels 120 on the first transparent substrate 110. The pixels 120 are formed on a first display area DA1 of the first substrate 110 in a matrix configuration, and the first display area DA1 is surrounded by a first peripheral area PA1. Each of the pixels 120 includes a pixel electrode 129 to which a pixel voltage is applied. The first transparent substrate 110 includes a pixel voltage applying line for applying a pixel voltage from the first peripheral area PA1 to the first display area DA1 and a common voltage applying line 190 for applying a common voltage to the first peripheral area PA1.

The second substrate 200 includes a second transparent substrate 210 and a common electrode 220 formed on the second transparent substrate. The second substrate 200 includes a second display area DA2 facing the first display area DA1 of the first substrate 100 and a second peripheral area PA2 surrounding the second display area DA2. The common electrode 220 is formed at the second display area DA2 and second peripheral area PA2 so as to partially cover the second display area DA2 and second peripheral area PA2. The common electrode 220 receives the common voltage applied to the common voltage applying line 190 of the first substrate 100.

The first and second substrates 100 and 200 are disposed such that the pixel electrodes 120 face the common electrode 220.

The common voltage-applying member 300 is disposed between the first and second substrates 100 and 200 and applies the common voltage applied to the first peripheral area PA1 of the first substrate 100 to the common electrode 220 of the second substrate 200. The common voltage-applying member 300 is disposed between the first peripheral area PA1 of the first substrate 100 and the second peripheral area PA2 of the second substrate 200. In various exemplary embodiments of the invention, the common voltage-applying member 300 may be formed at the first peripheral area PA1 or the second peripheral area PA2. The common voltage-applying member 300 includes an insulator 350 and a conductor 390 wrapping the insulator 350. The insulator 350 includes a photosensitive material and is formed during fabrication of the first and second substrates 100 and 200. The conductor 390 is formed on a surface of the insulator 350 during formation of the common electrode 220 or the pixel electrode 129.

The liquid crystal 400 is disposed between the pixels 120 of the first substrate 100 and the common electrode 220 of the second substrate 200. The liquid crystal 400 has a varying arrangement due to an electric field difference between the pixel voltage applied to the pixel electrode 129 of the first substrate 100 and the common voltage applied to the common electrode 220 through the common voltage applying member 300.

The LCD apparatus 600 according to the present embodiment of the invention may be manufactured to have a structure that can apply the common voltage applied to the first substrate 100 to the second substrate 200 without any additional process steps. Thus, the manufacturing processes for the LCD apparatus 600 may be simplified. Also, the LCD apparatus 600 may be manufactured at a lower cost because it does not use a spacer made of gold (Au).

Figure 2:
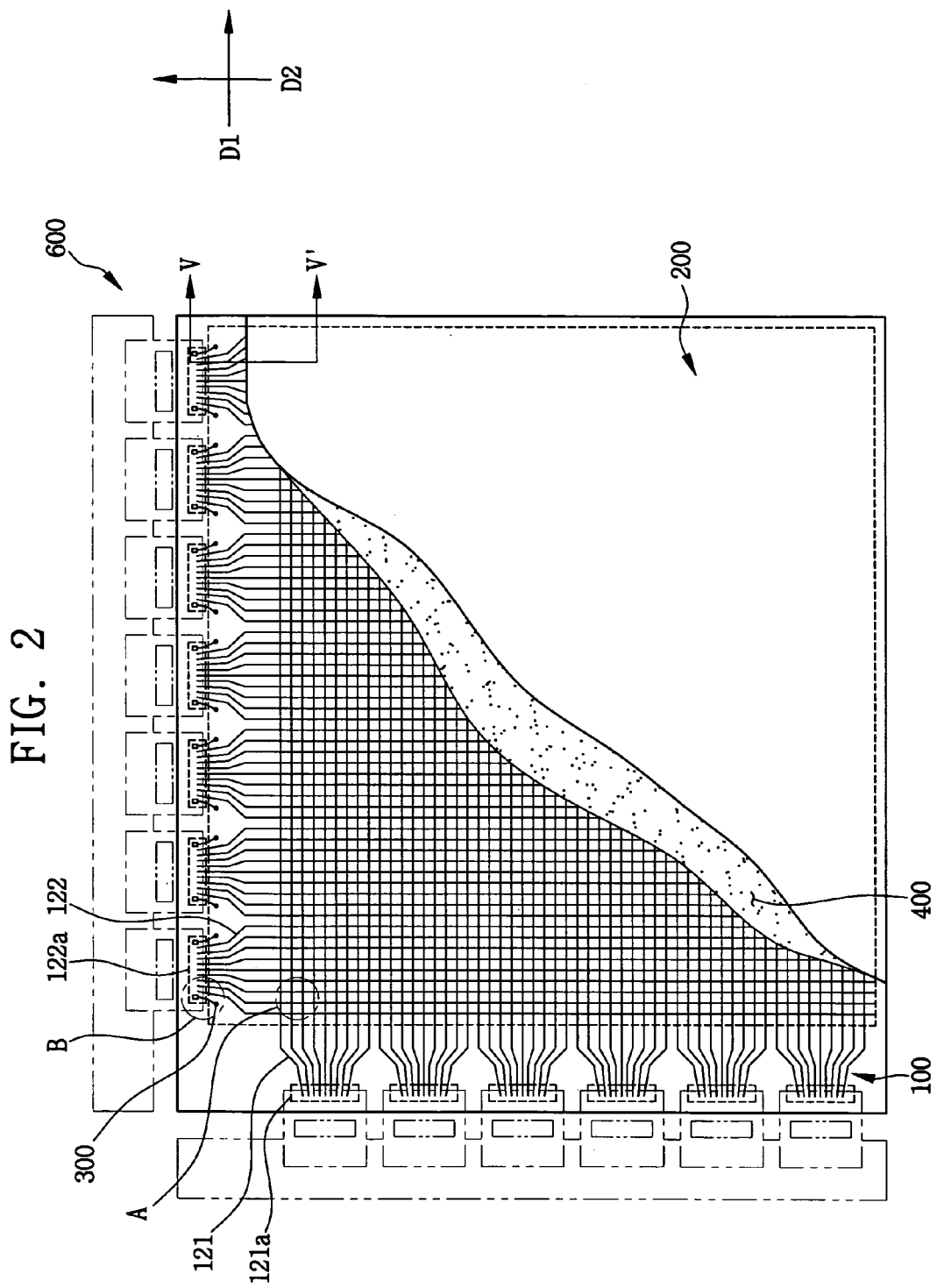
FIG. 2 is a schematic plan view of an LCD apparatus according to an another exemplary embodiment of the present invention.
Figure 3:
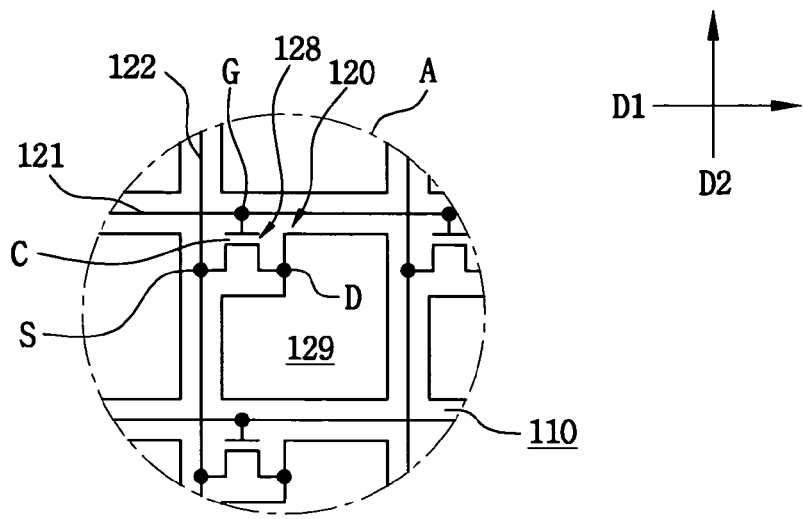
FIG. 3 is a partially enlarged view showing a portion "A" of FIG. 2.
Figure 4:
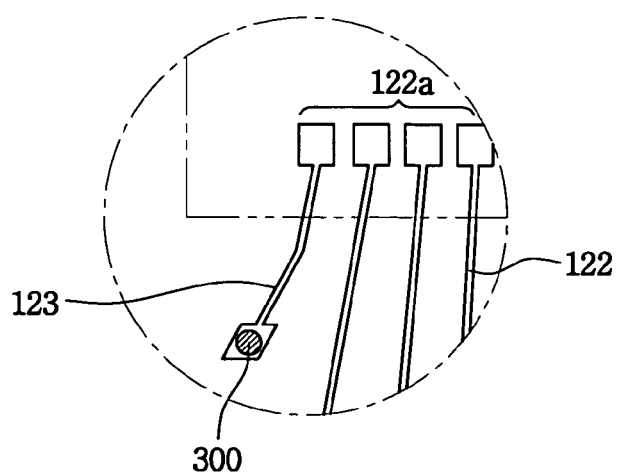
FIG. 4 is a partially enlarged view showing a portion "B" of FIG. 2.
Figure 5:
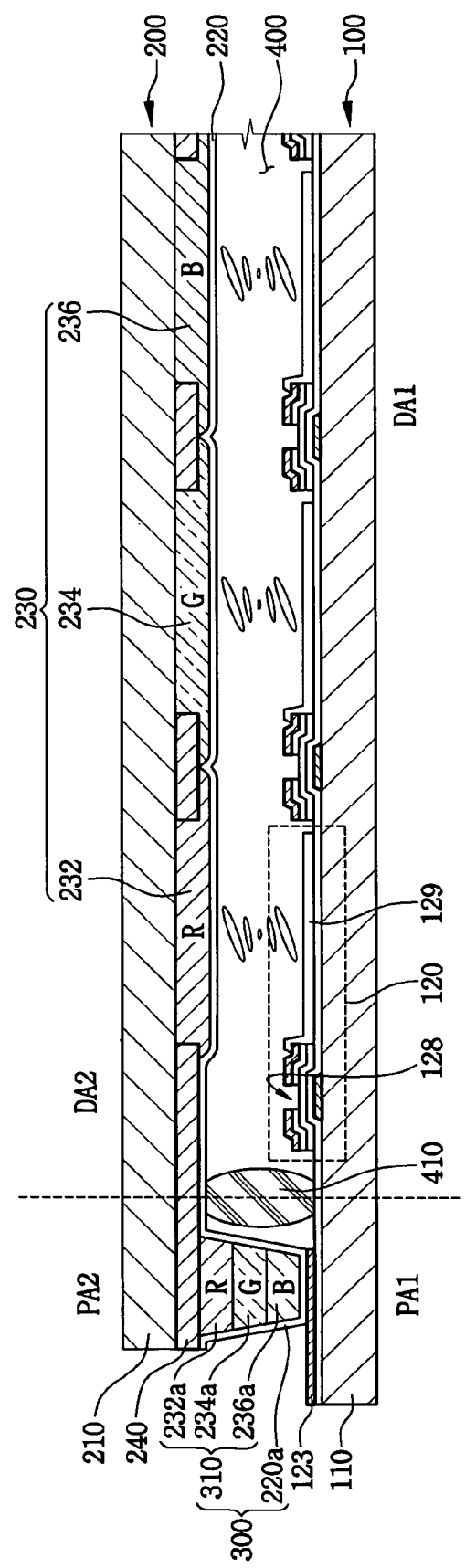
FIG. 5 is a cross-sectional view taken along the line V-V' of FIG. 2.

FIG. 2 is a schematic plan view showing an LCD apparatus according to another exemplary embodiment of the present invention. FIG. 3 is a partially enlarged view showing a portion "A" of FIG. 2. FIG. 4 is a partially enlarged view showing a portion "B" of FIG. 2. FIG. 5 is a cross-sectional view taken along the line V-V' of FIG. 2.

Referring to FIG. 2, an LCD apparatus 600 includes a first substrate 100, a second substrate 200, a power supply member 300 and liquid crystal 400.

Referring to FIG. 5, the first substrate 100 includes a first transparent substrate 110 having a first display area DA1 and a first peripheral area PA1 surrounding the first display area DA1 and a plurality of pixels 120 disposed at the first display area DA1.

Referring to FIG. 3, the pixels 120 are arranged at the first display area DA1 in a matrix configuration. For example, when the LCD apparatus 600 has a resolution of 1024×768, 1024×768×3 units of the pixels 120 units are formed at the first transparent substrate 110.

Each of the pixels 120 includes a gate bus line 121, a data bus line 122, a thin film transistor (TFT) 128 and a pixel electrode 129.

Referring to FIGS. 2 and 3, the gate bus line 121 is extended in a first direction D1 from the first peripheral area PA1 through the first display area DA1. If the LCD apparatus 600 has a resolution of 1024×768, 768 gate bus lines 121 are formed at the first transparent substrate 110. The 768 gate bus lines 121 are divided into three groups and each group is disposed at the first peripheral area PA1 as a gate bus line channel 121a. Thus, three gate bus line channels 121a are formed at the first peripheral area PA1. Each of the gate bus line channels 121a is connected to a gate tape carrier package (TCP) to which a driving signal is applied.

The data bus line 122 is insulated from the gate bus line 121 and extended in a second direction D2 substantially perpendicular to the first direction D1. The data bus line 122 is extended from the first peripheral area PA1 to the first display area DA1. If the LCD apparatus 600 has a resolution of 1024×768, 1024×3 units of data bus lines 122 are formed at the first transparent substrate 110. The 1024×3 units of data bus lines 122 are divided into twelve groups and each group is disposed at the first peripheral area PA1 as a data bus line channel 122a. Thus, twelve data bus line channels 122a are formed at the first peripheral area PA1. Each of the data bus line channels 122a is connected to a data TCP to which a driving signal is applied.

Referring to FIG. 3, the TFT 128 includes a gate electrode G, a source electrode S, a drain electrode D and a channel layer C. The gate and source electrodes G and S are extended from the gate and data bus lines 121 and 122, respectively. The channel layer C is insulated from the gate electrode G and disposed on the gate electrode G. When a voltage is applied to the gate electrode G, the channel layer C operates as a conductor. When the voltage is not applied to the gate electrode G, the channel layer C operates as an insulator. The source and drain electrodes S and D are electrically insulated from the channel layer C and connected to the channel layer C.

The pixel electrode 129 is connected to the drain electrode D of the TFT 128. The pixel electrode 129 comprises a transparent conductive material, such as, for example, indium tin oxide, indium zinc oxide, etc.

Referring to FIG. 4, a common voltage applying line 123 is formed at a position adjacent to the data bus line channel 122a of the first peripheral area PA1 of the first substrate 100. The common voltage applying line 123 receives the common voltage externally provided through the first peripheral area PA1 of the first substrate 100. A plurality of common voltage applying lines is formed at the first peripheral area PA1 so as to apply the common voltage having a uniform level to the common electrode 220 shown in FIG. 5.

Referring to FIGS. 2 and 5, the second substrate 200 includes a second transparent substrate 210, a color filter 230, a common electrode 220 and a power-applying member 300. The second substrate 200 may further include a black matrix 240.

The second transparent substrate 210 faces the first transparent substrate 110 and includes a second display area DA2 and a second peripheral area PA2 surrounding the second display area DA2. The second display area DA2 and second peripheral area PA2 face the first display area DA1 and first peripheral area PA1 of the first substrate 100, respectively.

The color filter 230 is disposed at the second display area DA2 of the second transparent substrate 210 in a matrix configuration, thereby facing the pixel electrode 129. The color filter 230 includes a red color filter 232, a green color filter 234 and a blue color filter 236. Two color filters adjacent to each other among the red, green and blue color filters 232, 234 and 236 may be overlapped at edges thereof. Thus, the red, green and blue color filters 232, 234 and 236 may prevent light from leaking between the red, green and blue color filters 232, 234 and 236.

In the present exemplary embodiment of the invention, the black matrix 240 is formed between the first transparent substrate 210 and common electrode 220. The black matrix 240 has a lattice-shape so as to block a space between the pixel electrode 129 and an adjacent pixel electrode. The black matrix 240 preferably includes a chromium layer, a double-layer having a chromium layer and a chromium oxide layer, or a black organic layer having a light transmittance substantially equal to that of chromium Cr.

The common electrode 220 includes a transparent conductive material, such as, for example, ITO, IZO or the like. The common electrode 220 is formed over the second display area DA2 and on a portion of the second peripheral area PA2 so as to cover the color filter 230.

Referring to FIG. 5, the power-applying member 300 includes an insulator 310 and a conductor 220a.

The insulator 310 is formed at the second peripheral area PA2 of the second substrate 200. The insulator 310 faces the common voltage applying line 123 formed at the first peripheral area PA1 of the first substrate 100. In the present exemplary embodiment of the invention, the insulator 310 is formed using portions of color filter layers used for the color filter 230. The color filter layers include a red color filter layer 232a, a green color filter layer 234a and a blue color filter layer 236a. The red, green and blue color filter layers 232a, 234a and 236a formed at the second peripheral area PA2 are formed at the same time the color filter 230 is formed at the second display area DA2. Particularly, the red color filter layer 232a is formed with the red color filter 232 formed at the second display area DA2, the green color filter layer 234a is formed on the red color filter layer 232a with the green color filter 234 formed at the second display area DA2, and the blue color filter layer 236a is formed on the green color filter layer 234a with the blue color filter 236 formed at the second display area DA2.

The insulator 310 having the red, green and blue color filter layers 232a, 234a and 236a has a thickness substantially equal to a distance between the first and second substrates 100 and 200.

The conductor 220a covers the insulator 310 formed at the second peripheral area PA2. The conductor 220a is partially connected to the common electrode 220 and common voltage applying line 123. In the present exemplary embodiment of the invention, the conductor 220a includes a transparent conductive material, such as, for example, ITO or IZO. The conductor 220a may be formed using the same material as the common electrode 220, so that the conductor 220a may be simultaneously formed with the common electrode 220.

A sealing member 410 having a band shape is formed at a boundary between the first peripheral area PA1 and first display area DA1 of the first substrate 100 or at a boundary between the second peripheral area PA2 and second display area DA2 of the second substrate 200. The liquid crystal 400 is dropped into the first display area DA1 or second display area DA2 surrounded by the sealing member 410, and then the first substrate 100 is assembled with the second substrate 200. Alternatively, the liquid crystal 400 may be injected between the first and second substrates 100 and 200 after the first and second substrates 100 and 200 are assembled with each other using the sealing member 410.

Figure 6A:
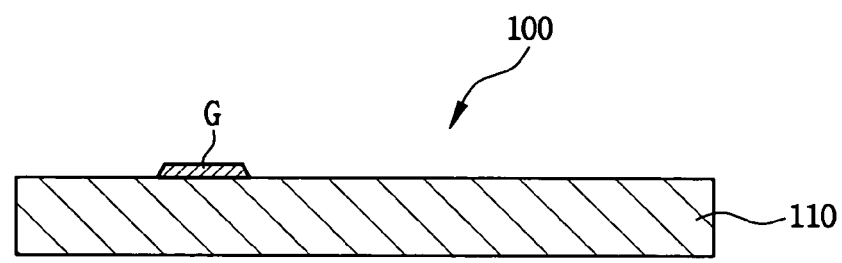
FIGS. 6A and 6B are schematic views showing a gate bus line and a gate electrode formed on the first transparent substrate according to an exemplary embodiment of the present invention.

FIGS. 6A-13 are cross sectional views showing steps of a method for forming a liquid crystal display apparatus according to an embodiment of the invention. Referring to FIGS. 6A and 6B, a gate metal, such as, for example, aluminum, aluminum alloy, etc., is formed over the first transparent substrate 110 of the first substrate 100 using chemical vapor deposition or sputtering.

Figure 6B:
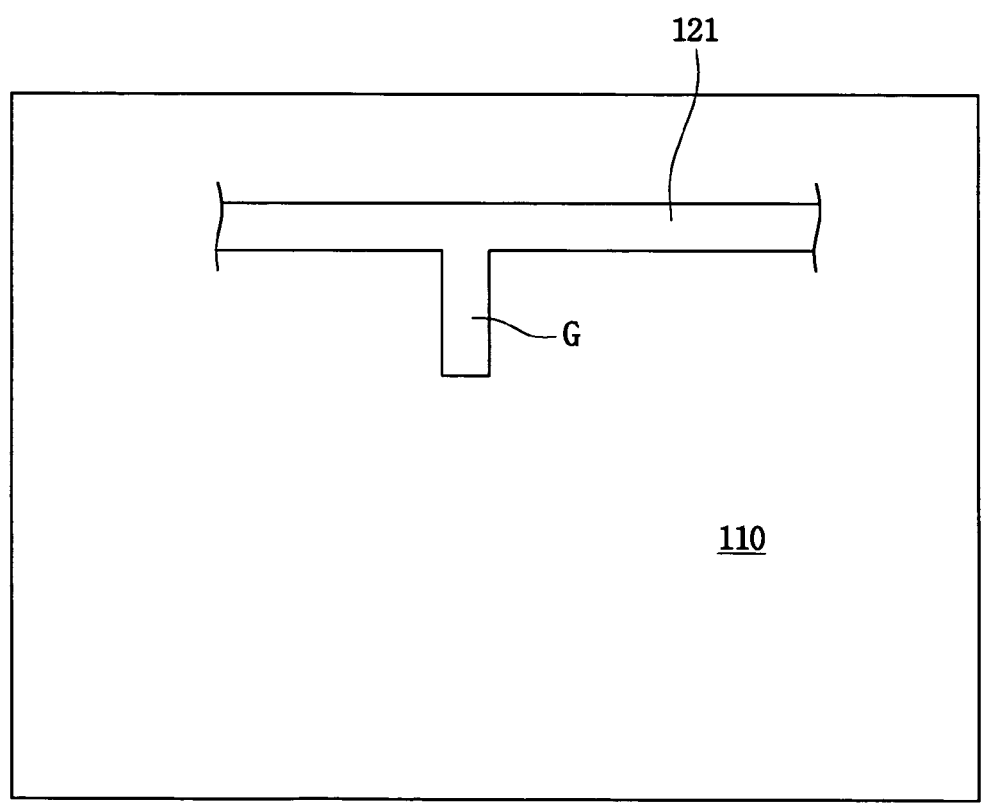

A photoresist layer is formed on the first transparent substrate 110 and the photoresist layer is partially exposed to light using a first mask. As a result, the gate bus line 121 is formed on the first transparent substrate 110 in the first direction D1 and the gate electrode G extending from the gate bus line 121 in the second direction D2 is formed as shown in FIGS. 2 and 6B. When the LCD apparatus 600 has a resolution of 1024×768, 768 gate bus lines 121 are formed on the first transparent substrate 110 and 1024×3 units of gate electrodes G extend from one gate bus line 121.

After the gate bus line 121 and gate electrode G are formed on the first transparent substrate 110, a gate-insulating layer 127 is formed over the first transparent substrate 110.

Figure 7A:
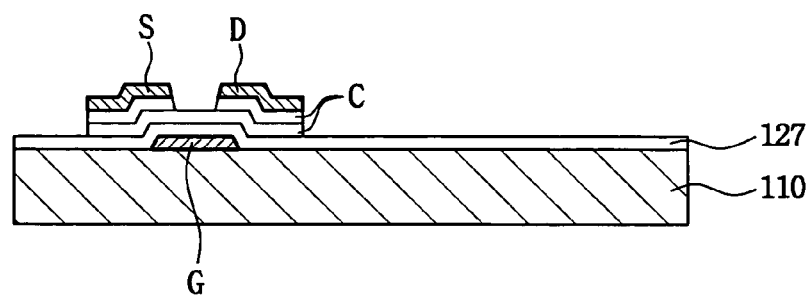
FIGS. 7A and 7B are schematic views showing a channel layer formed on a first transparent substrate according to an exemplary embodiment of the present invention.
Figure 7B:
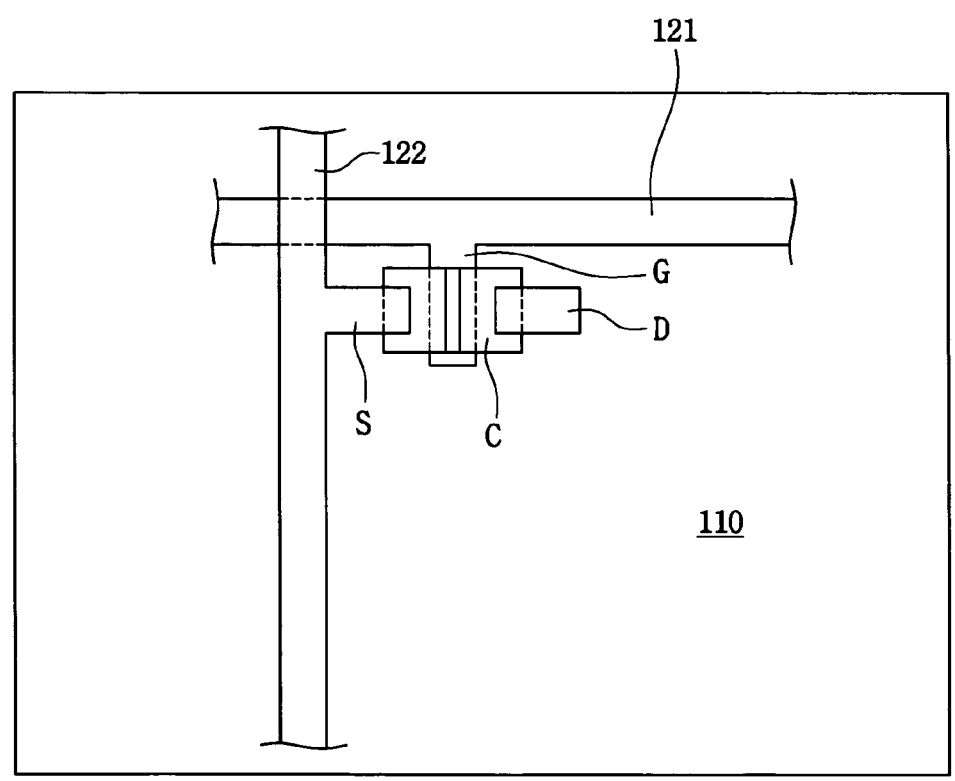

Referring to FIGS. 7A and 7B, an amorphous silicon layer, an n+ amorphous silicon layer and a source/drain metal layer are successively formed on the gate-insulating layer 127. A photoresist layer is formed on the source/drain metal layer and patterned using a second mask, thereby forming a photoresist pattern at a position corresponding to the channel layer C. The source/drain metal layer, n+ amorphous silicon layer and amorphous silicon layer are successively etched using the photoresist pattern as a mask. As a result, the data bus line 122 extended in the second direction D2, source electrode S extended from the data bus line 122 in the first direction D1 and drain electrode D extended from the data bus line 122 in the first direction D1 are simultaneously formed. When the photoresist pattern is etched back, the n+ amorphous silicon layer is divided to form the channel layer C.

Figure 8A:
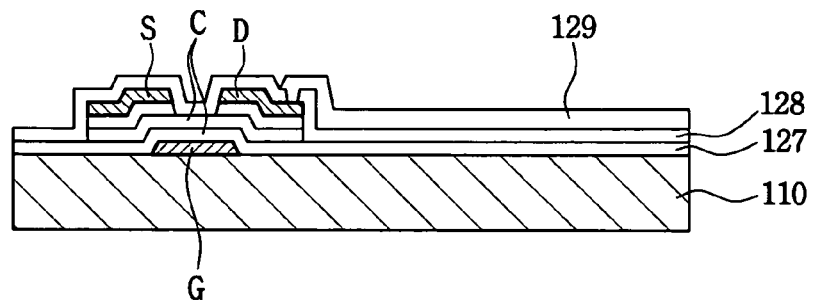
FIGS. 8A and 8B are schematic views showing a pixel electrode formed on a first transparent substrate according to an exemplary embodiment of the present invention.
Figure 8B:
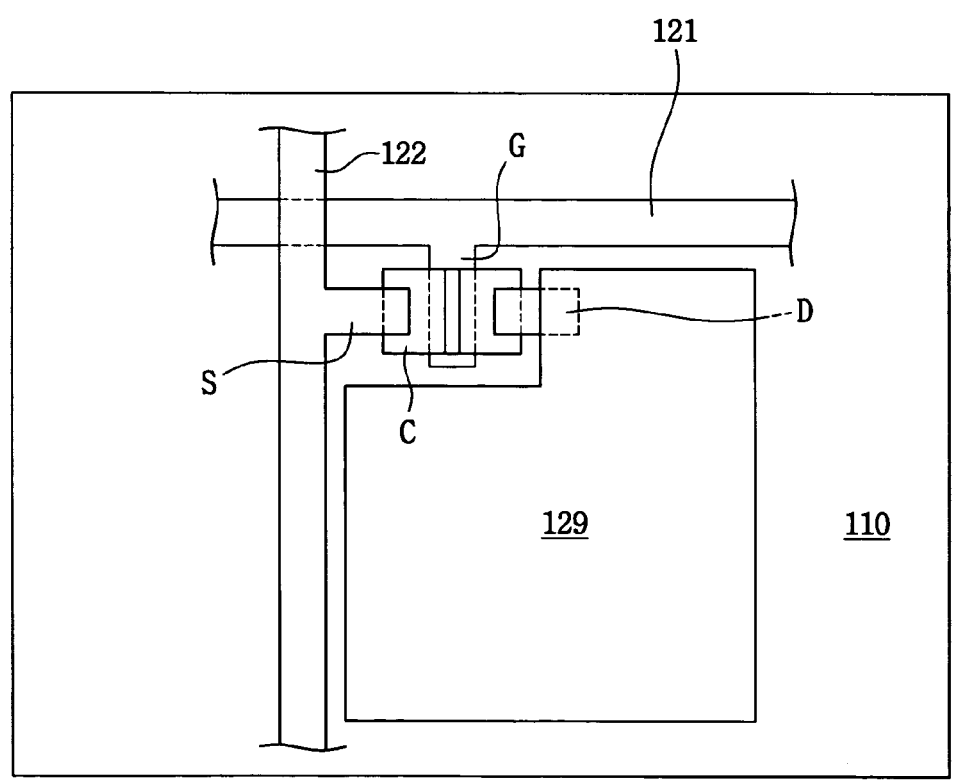

Referring to FIGS. 8A and 8B, a transparent protection layer 128 is formed over the first transparent substrate 110 and a photoresist layer is formed on the protection layer 128. A contact hole is formed in the protection layer 128 to partially expose the drain electrode D by etching the protection layer 128 using a third mask. A transparent conductive material, such as, for example, ITO or IZO, is formed over the protection layer 128. The pixel electrode 129 is formed by patterning the transparent conductive material using a fourth mask.

Figure 9A:
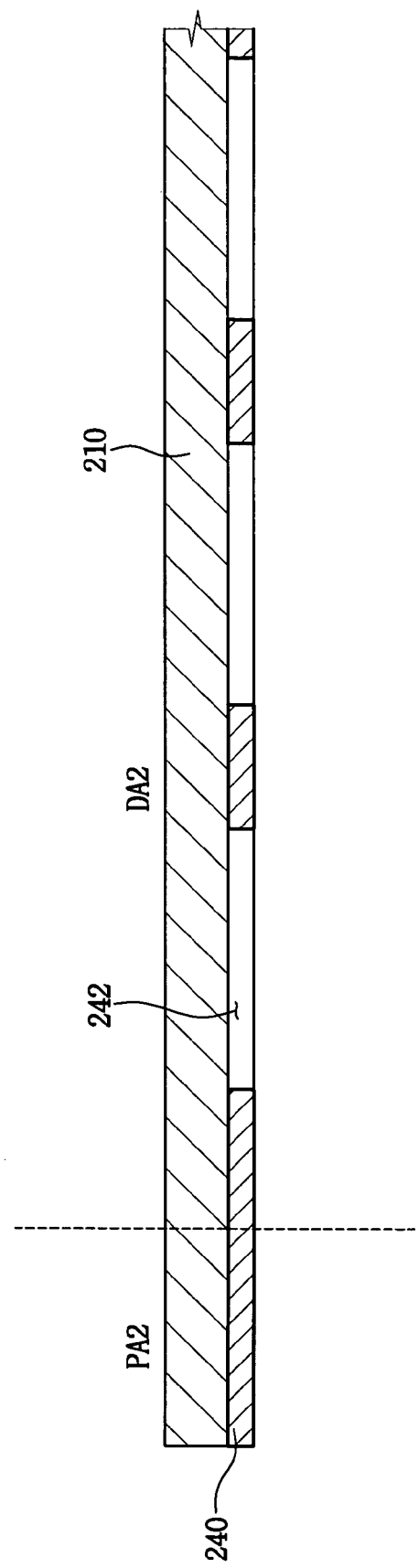
FIGS. 9A and 9B are schematic views showing a black matrix formed on a second transparent substrate according to an exemplary embodiment of the present invention.
Figure 9B:
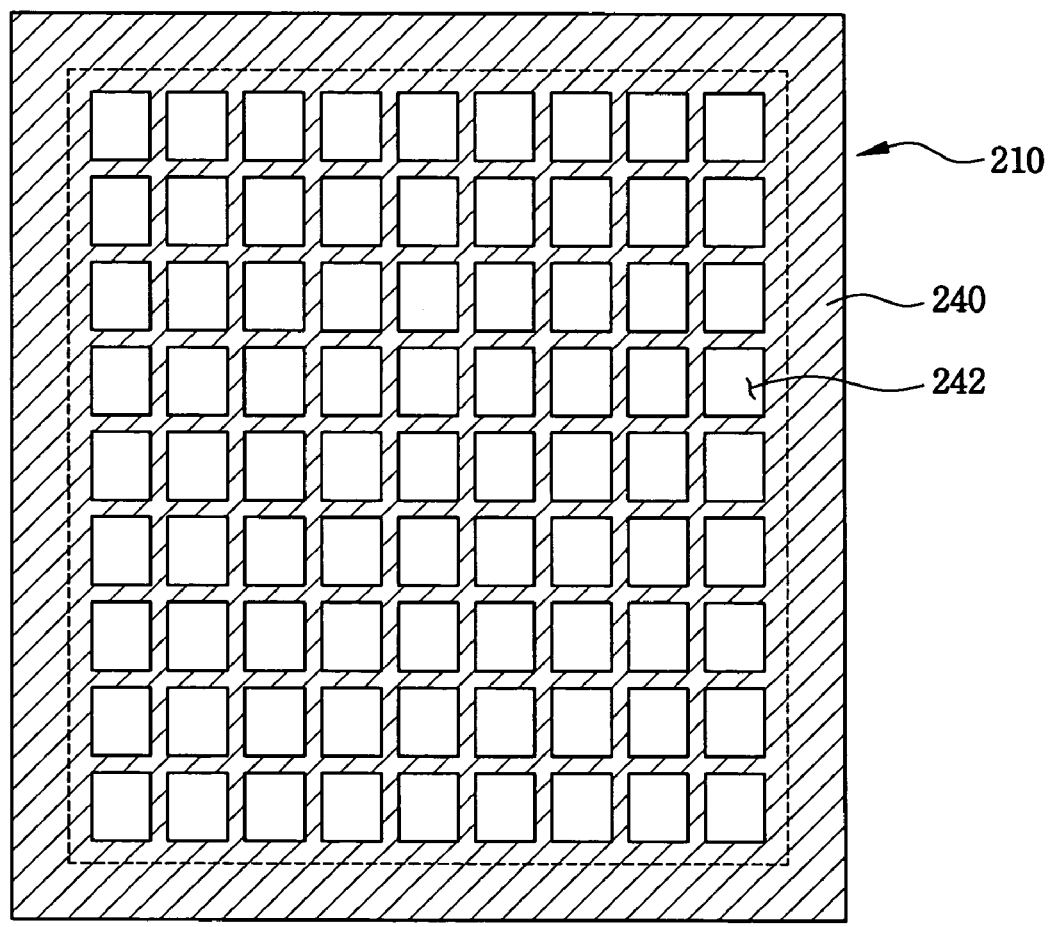

Referring to FIGS. 9A and 9B, a black layer, such as, for example, a chromium layer, a double-layer having a chromium layer and a chromium oxide layer or a black organic layer, is formed over the second transparent substrate 210. A photoresist layer is coated on the black layer and patterned, and the patterned photoresist layer is used to form an opening 242 in the black layer corresponding to the pixel electrode 129 of the first substrate 100. As a result, the black matrix 240 is formed at the second display area DA2 of the second transparent substrate 210 as shown in FIG. 9B.

Figure 10A:
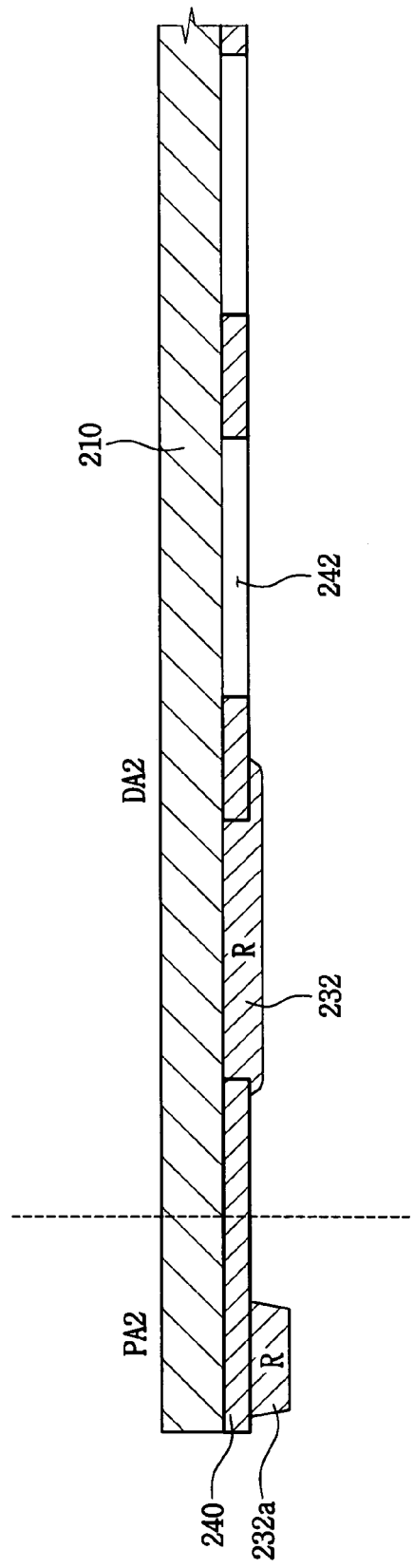
FIGS. 10A and 10B are schematic views showing a red color filter and a color filter layer formed on a second transparent substrate according to an exemplary embodiment of the present invention.
Figure 10B:
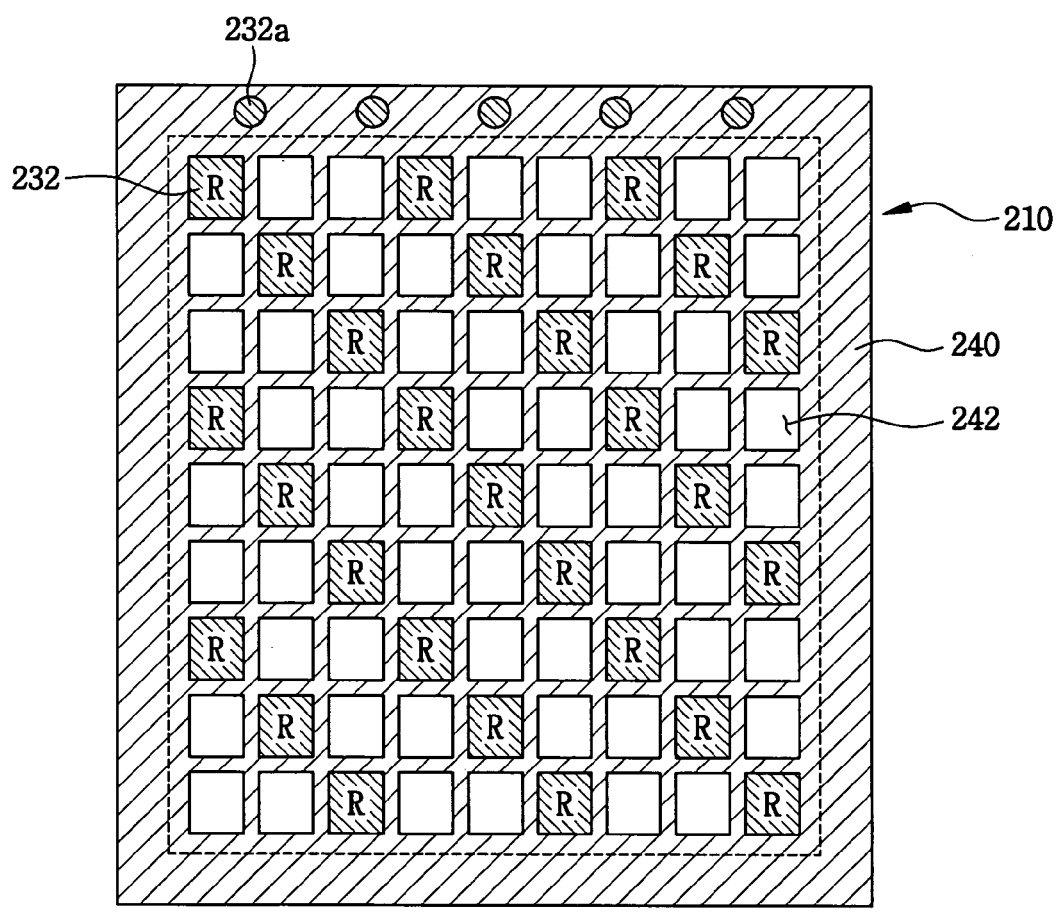

Referring to FIGS. 10A and 10B, a red color filter material is formed over the second transparent substrate 210. The red color filter material is patterned through a photolithography process to form the red color filter layer 232a at the second peripheral area PA2 and to form the red color filter 232 at the opening 242 of the black matrix 240.

Figure 11A:
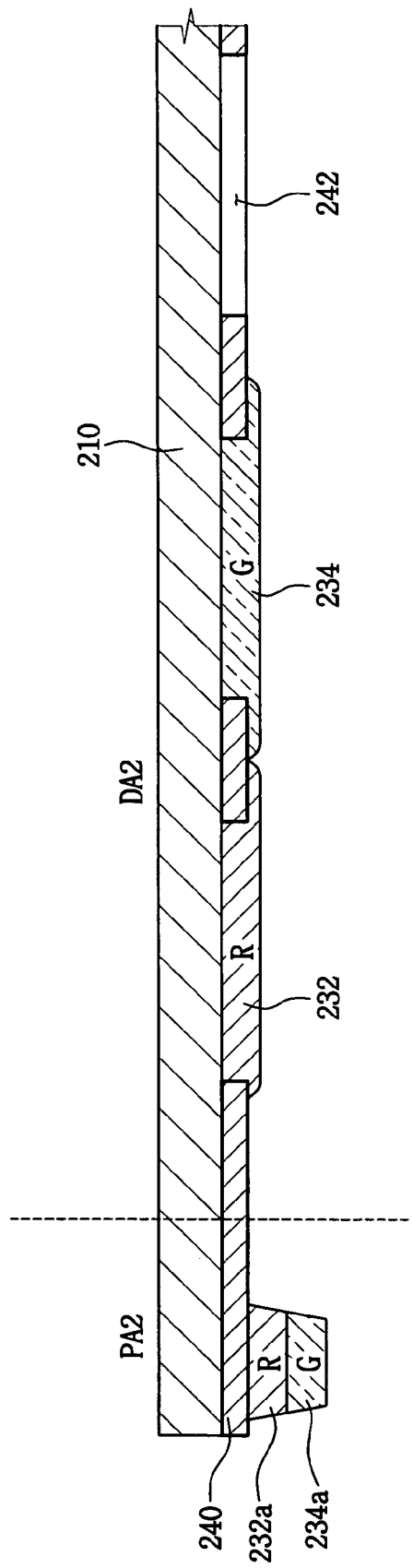
FIGS. 11A and 11B are schematic views showing a green color filter and a green color filter layer formed on a second transparent substrate according to an exemplary embodiment of the present invention.
Figure 11B:
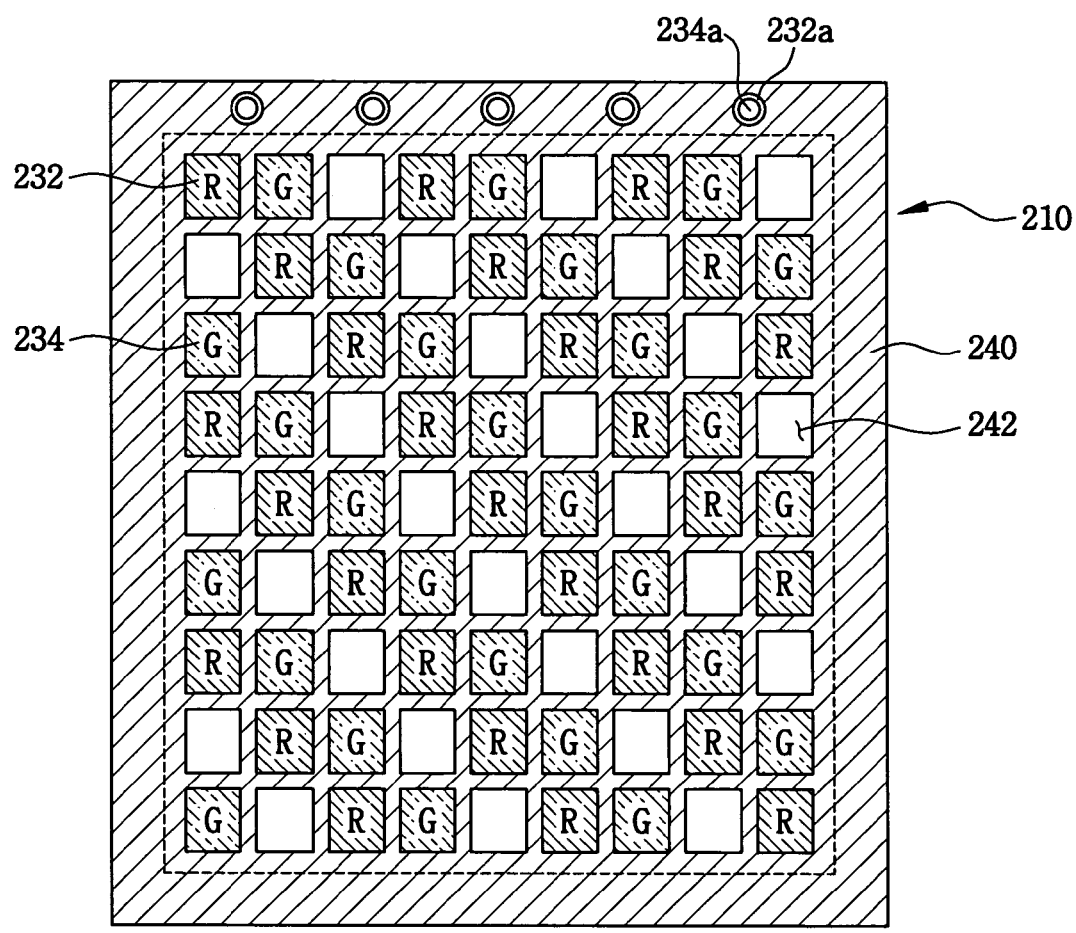

Referring to FIGS. 11A and 11B, a green color filter material is formed over the second transparent substrate 210. The green color filter material is patterned through a photolithography process to form the green color filter layer 234a on the red color filter layer 232a formed at the second peripheral area PA2 and to form the green color filter 234 at the opening 242 of the black matrix 240.

Figure 12A:
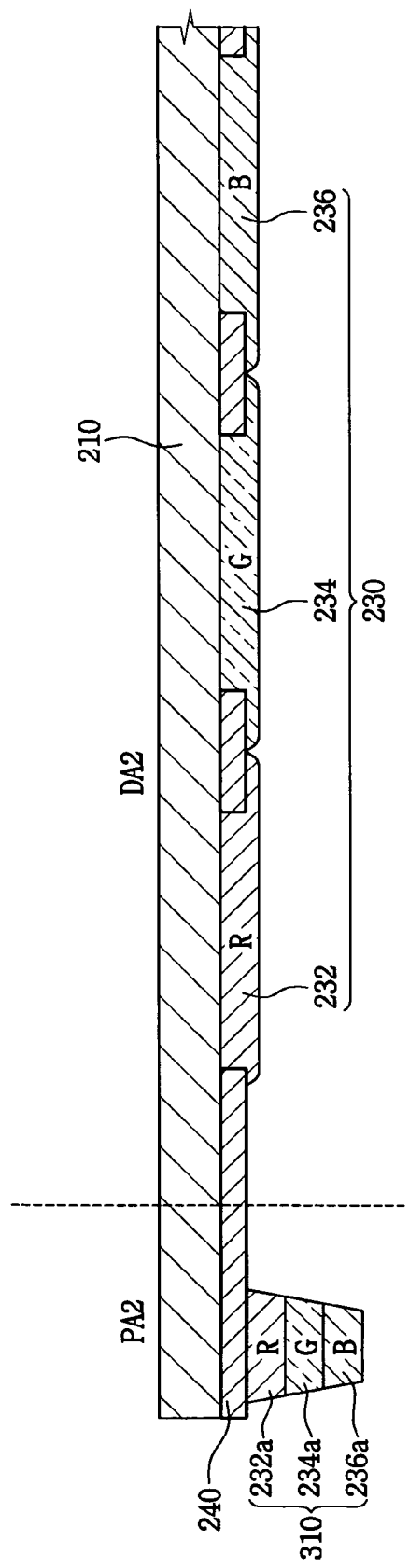
FIGS. 12A and 12B are schematic views showing a blue color filter and a blue color filter layer formed on a second transparent substrate according to an exemplary embodiment of the present invention.
Figure 12B:
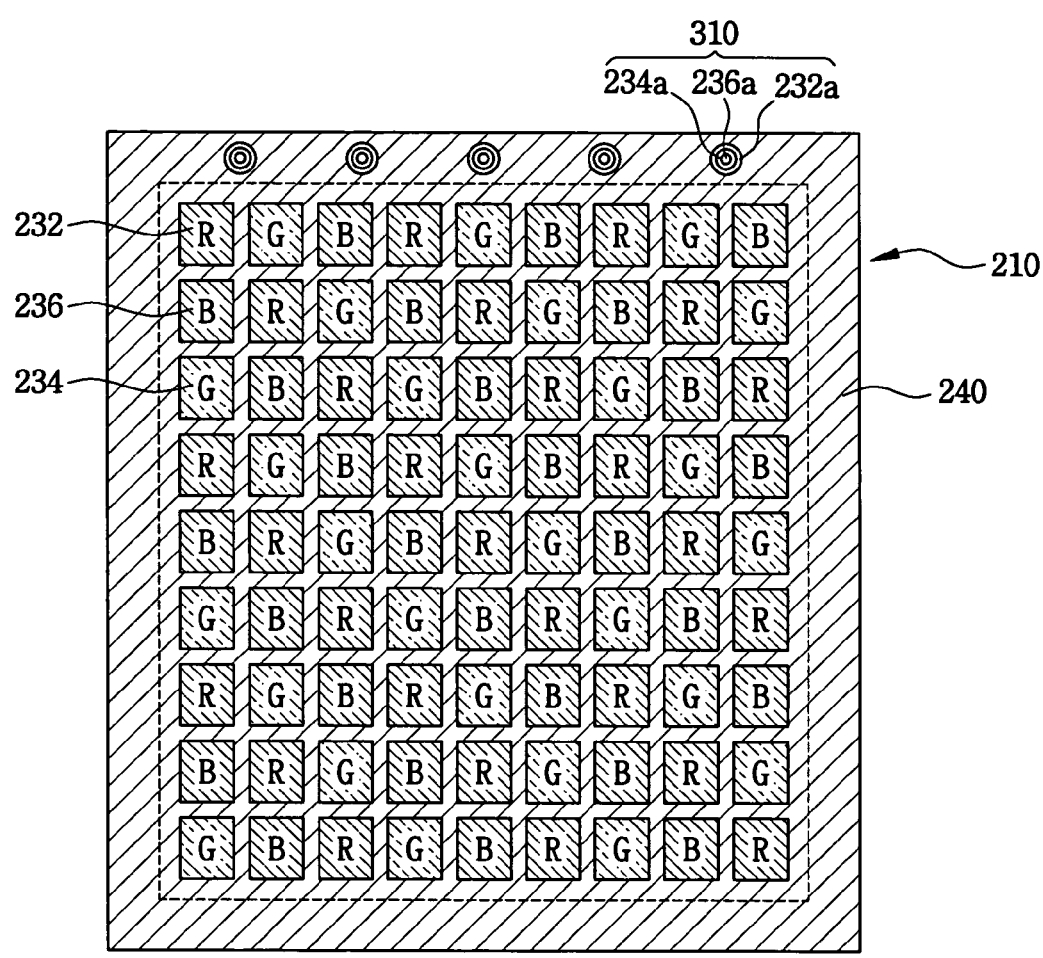

Referring to FIGS. 12A and 12B, a blue color filter material is formed over the second transparent substrate 210. The blue color filter material is patterned through a photolithography process to form the blue color filter layer 236a on the green color filter layer 234a formed at the second peripheral area PA2 and to form the blue color filter 236 at the opening 242 of the black matrix 240.

The red, green and blue color filter layers 232a, 234a and 236a formed at the second peripheral area PA2 of the second transparent substrate 210 operate as the insulator 310. As shown in FIGS. 12a and 12b, the insulator 310 has a nub-like shape having a base portion formed of the red color filter layer 232a and a top portion formed of the blue color filter layer 236a. The red color filter layer 232a has larger cross sectional area than that of the blue color filter 236a, so that the insulator 310 is tapered from the base portion to the top portion.

Figure 13:
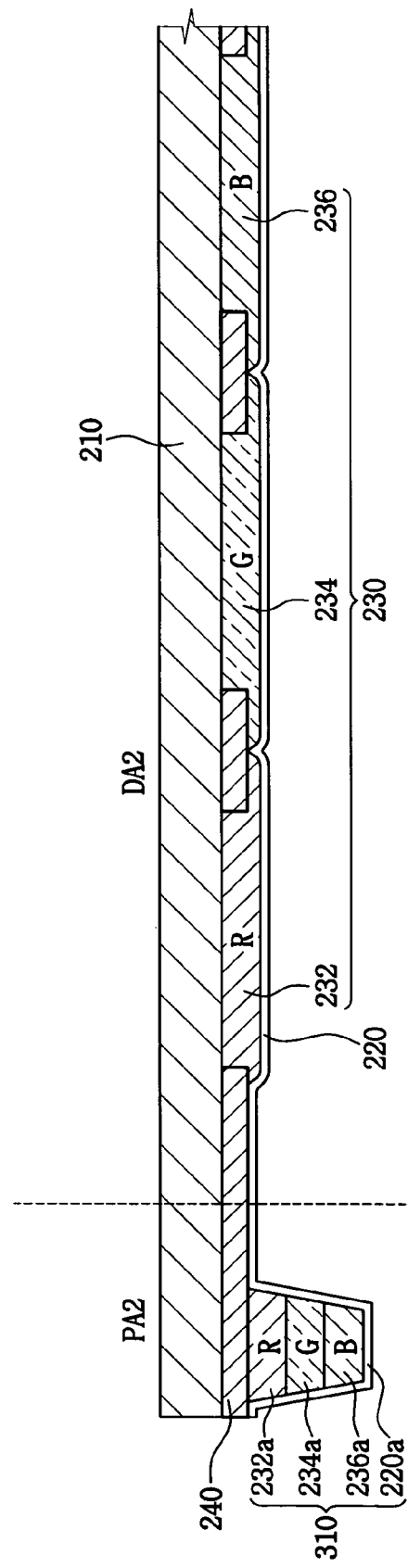
FIG. 13 is a cross-sectional view showing a common electrode and a conductor formed on a second transparent substrate according to an exemplary embodiment of the present invention.

Referring to FIG. 13, a transparent conductive layer, such as, for example, ITO or IZO, is formed over the second transparent substrate 210 to cover the red, green and blue color filters 232, 234 and 236. The transparent conductive layer may be formed only at the second display area DA2 of the second transparent substrate 210, or formed to cover the insulator 310 formed at the second peripheral area PA2 and the color filter 230 formed at the second display area DA2 of the second transparent substrate 210.

In present exemplary embodiment of the invention, the transparent conductive layer covers the insulator 310 formed at the second peripheral area PA2 and the color filter 230 formed at the second display area DA2 of the second transparent substrate 210. A portion of the transparent conductive layer, which covers the color filter 230 of the second display area DA2, operates as the common electrode 220, and a portion of the transparent conductive layer, which covers the insulator 310 of the second peripheral area PA2 operates as the conductor 220a.

The first substrate 100 is assembled with the second substrate 200 as shown in FIG. 5. The conductor 220a of the second substrate 200, which covers the insulator 310, is aligned to be connected to the common voltage applying line 123 of the first substrate 100. The color filter 230 of the second substrate 200 is aligned with the pixel electrode 129 of the first substrate 100. To assemble the first and second substrates 100 and 200 with each other, the sealing member 410 is formed at the boundary between the first peripheral area PA1 and first display area DA1 of the first substrate 100 or at a boundary between the second peripheral area PA2 and second display area DA2 of the second substrate 200. Then, the liquid crystal 400 is injected between the first and second substrates 100 and 200 after or before assembling the first and second substrates 100 and 200 with each other.

As shown in FIG. 2, a driving module is assembled with the gate and data bus lines 121 and 122 after injecting the liquid crystal 400 between the first and second substrates 100 and 200, thereby forming the LCD apparatus 600.

According to this exemplary embodiment of the invention, the insulator 310 and conductor 220a are formed at the second peripheral area PA2 of the second substrate 200 at the same time the color filter 230 is formed at the second display area PA2 of the second substrate 200 to apply the common voltage applied to the first substrate to the common electrode 220 through the conductor 220a.

Figure 14:
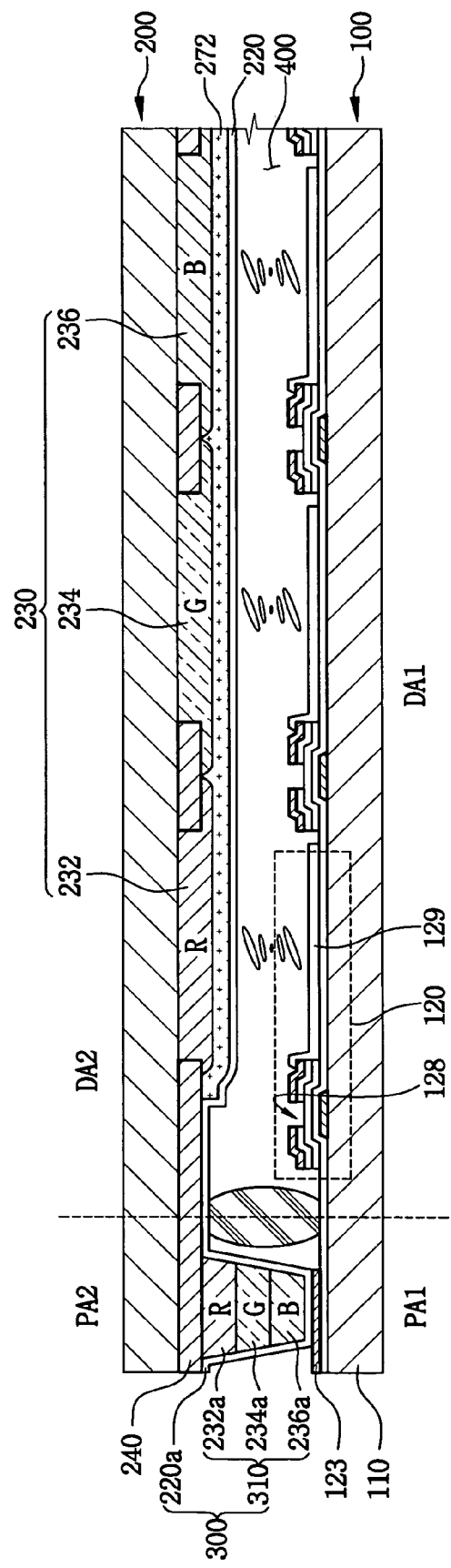
FIG. 14 is a cross-sectional view of an LCD according to another exemplary embodiment of the present invention.

FIG. 14 is a cross-sectional view of an LCD according to another exemplary embodiment of the present invention. In FIG. 14, the same reference numerals denote the same elements in FIGS. 2 to 13, and thus the detailed descriptions of the same elements will be omitted.

Referring to FIG. 14, a transparent planarizing layer 272 is formed over a second transparent substrate 210 of the second substrate 200 to improve step coverage of a color filter 230 formed at a second substrate 200. A portion of the planarizing layer 272 that covers an insulator 310 formed at a second peripheral area PA2 is removed by a photolithography process.

According to the present exemplary embodiment of the invention, the insulator 310 and conductor 220a are formed at the second peripheral area PA2 of the second substrate 200 and the color filter 230 is formed at the second display area PA2 of the second substrate 200 to provide the common voltage applied to the first substrate to the common electrode 220 through the conductor 220a. Thus, the manufacturing processes for the LCD apparatus 600 is simplified and the LCD apparatus 600 may be manufactured at a lower cost since the LCD apparatus does not use a gold (Au) spacer. Also, the step coverage of the color filter 230 and the common electrode 220 of the LCD apparatus 600 is improved.

Figure 15:
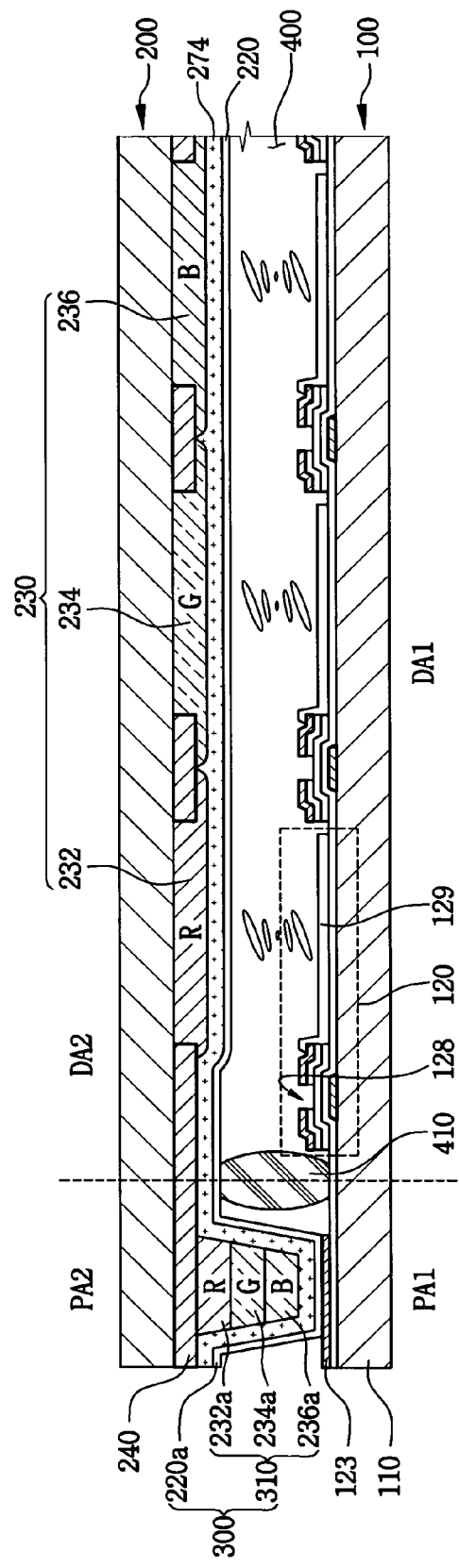
FIG. 15 is a cross-sectional view of an LCD according to another exemplary embodiment of the present invention.

FIG. 15 is a cross-sectional view of an LCD according to another exemplary embodiment of the present invention. In FIG. 15, the same reference numerals denote the same elements in FIGS. 2 to 13, and thus the detailed descriptions of the same elements will be omitted.

Referring to FIG. 15, a transparent planarizing layer 272 is formed over a second transparent substrate 210 of the second substrate 200 to improve step coverage of a color filter 230 formed at a second substrate 200. When the combined thickness of a conductor 220a and an insulator 310 is smaller than a cell gap between the first and second substrates 100 and 200, the planarizing layer 272 may be formed over the color filter 230 and insulator 310. In this exemplary embodiment of the invention, the planarizing layer 272 is formed between the conductor 220a and insulator 310, so that the conductor 220a may electrically connect a common voltage applying line 123 of the first substrate 100 to the common electrode 220 of the second substrate 200.

According to this exemplary embodiment of the invention, the insulator 310 and conductor 220a are formed at the second peripheral area PA2 of the second substrate 200 and the color filter 230 is formed at the second display area PA2 of the second substrate 200 to provide the common voltage applied to the first substrate to the common electrode 220 through the conductor 220a. Thus, the manufacturing processes for the LCD apparatus 600 is simplified and the LCD apparatus 600 may be manufactured at a lower cost since the LCD apparatus does not use a gold (Au) spacer. Also, the step coverage of the color filter 230 and common electrode 220 of the LCD apparatus 600 is improved. Furthermore, the planarizing layer 272 is formed between the conductor 220a and insulator 310, thereby electrically connecting the common voltage applying line 123 of the first substrate 100 to the common electrode 220 of the second substrate 200.

Figure 16:
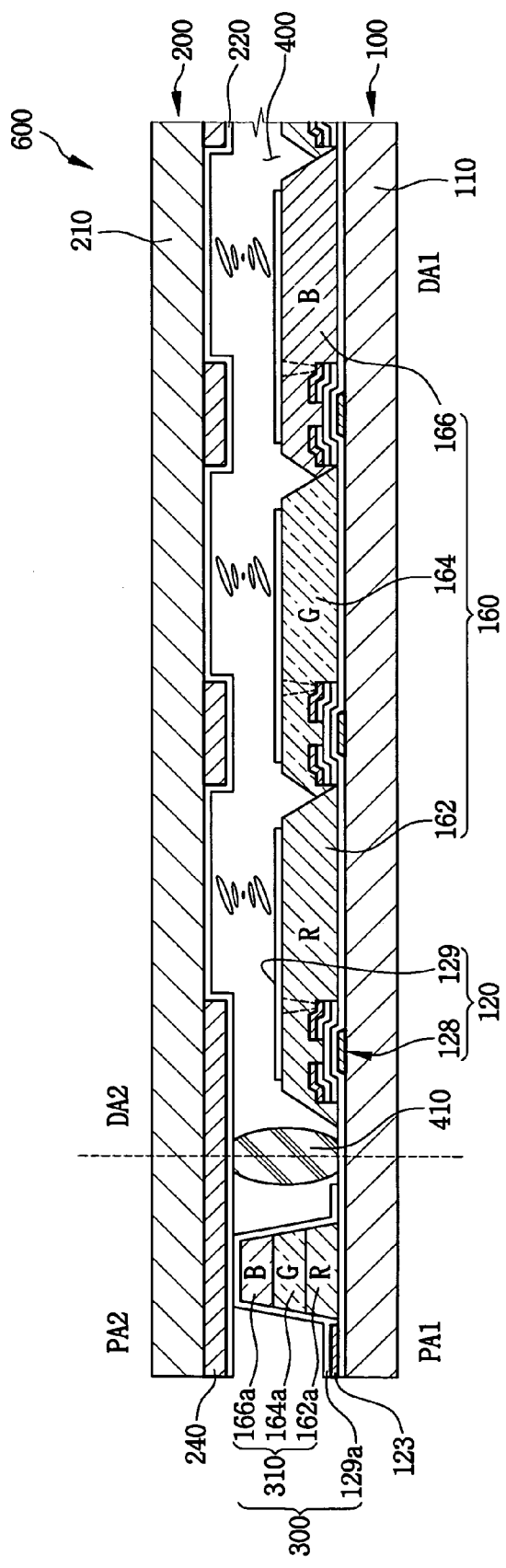
FIG. 16 is a cross-sectional view of an LCD apparatus according to another exemplary embodiment of the present invention.

FIG. 16 is a cross-sectional view of an LCD apparatus according to another exemplary embodiment of the present invention.

Referring to FIG. 16, an LCD apparatus 600 includes a first substrate 100, a second substrate 200, a power-applying member 300 and liquid crystal 400.

The first substrate 100 includes a first transparent substrate 110 having a first display area DA1 and a first peripheral area PA1 surrounding the first display area DA1, a plurality of pixels 120, a color filter 160 and the power-applying member 300.

The pixels 120 and color filter 160 are placed in the first display area DA1, and the power-applying member 300 is placed in the first peripheral area PA1.

Referring to FIGS. 2, 3 and 16, the pixels 120 are arranged in the first display area DA1 in a matrix configuration. For example, when the LCD apparatus 600 has a resolution of 1024×768, 1024×768×3 units of the pixels 120 are formed on the first transparent substrate 110.

Each of the pixels 120 includes a gate bus line 121, a data bus line 122, a thin film transistor (TFT) 128 and a pixel electrode 129.

The gate bus line 121 is extended in a first direction D1 from the first peripheral area PA1 through the first display area DA1. If the LCD apparatus 600 has a resolution of 1024×768, 768 gate bus lines 121 are formed on the first transparent substrate 110. The 768 gate bus lines 121 are divided into three groups and disposed in the first peripheral area PA1, and each of the three groups forms a gate bus line channel 121a. Thus, three gate bus line channels 121a are formed in the first peripheral area PA1. Each of the gate bus line channels 121a is connected to a gate TCP to which a driving signal is applied.

The data bus line 122 is insulated from the gate bus line 121 and extended in a second direction D2 substantially perpendicular to the first direction D1. The data bus line 122 is extended from the first peripheral area PA1 to the first display area DA1. If the LCD apparatus 600 has a resolution of 1024×768, 1024×3 units of data bus lines 122 are formed on the first transparent substrate 110. The 1024×3 units of data bus lines 122 are divided into twelve groups and disposed at the first peripheral area PA1, and each of the twelve groups form a data bus line channel 122a. Thus, twelve data bus line channels 122a are formed in the first peripheral area PA1. Each of the data bus line channels 122a is connected to a data TCP to which a driving signal is applied.

As shown in FIG. 3, the TFT 128 includes a gate electrode G, a source electrode S, a drain electrode D and a channel layer C. The gate and source electrodes G and S are extended from the gate and data bus lines 121 and 122, respectively. The channel layer C is insulated from the gate electrode G and disposed on the gate electrode G. When a voltage is applied to the gate electrode G, the channel layer C operates as a conductor. When the voltage is not applied to the gate electrode G, the channel layer C operates as an insulator. The source and drain electrodes S and D are electrically insulated from the channel layer and connected to the channel layer C.

A common voltage applying line 123 is formed at a position adjacent to the data bus line channel 122a of the first peripheral area PA1 of the first substrate 100. The common voltage applying line 123 receives the common voltage externally provided through the first peripheral area PA1 of the first substrate 100. A plurality of common voltage applying lines is formed at the first peripheral area PA1 to apply the common voltage having a uniform level to the common electrode 220 shown in FIG. 5.

The color filter 160 is disposed in the first display area DA1 of the first transparent substrate 110 in a matrix configuration, thereby covering the TFT 128. The color filter 160 includes a red color filter 162, a green color filter 164 and a blue color filter 166. Two color filters adjacent to each other among the red, green and blue color filters 162, 164 and 166 overlap at edges thereof. Also, each of the red, green and blue color filters 162, 164 and 166 includes a contact hole so as to partially expose the drain electrode D.

The pixel electrode 129 is formed on the red, green and blue color filters 162, 164 and 166. The pixel electrode 129 is connected to the drain electrode D of the TFT 128 through the contact hole. The pixel electrode 129 is made of a transparent conductive material, such as, for example, ITO or IZO.

When the pixel electrode 129 is formed on the color filter 160, the pixel electrode 129 may be placed at a position more distantly spaced from the gate and data bus lines 121 and 122. Thus, the LCD apparatus 600 may prevent a parasitic capacitance between the pixel electrode 129 and the gate and data bus lines 121 and 122, which in turn prevents deterioration of an image caused by distortion of the driving signal. Also, since the red, green and blue color filters 162, 164 and 166 are partially overlapped, the LCD apparatus 600 does not need a black matrix, thereby increasing an area through which light is transmitted.

The power-applying member 300 includes an insulator 310 and a conductor 129a.

The insulator 310 is formed in the first peripheral area PA1 of the first substrate 100. The insulator 310 is formed at a position adjacent to the common voltage applying line 123 formed in the first peripheral area PA1 of the first substrate 100. In this exemplary embodiment of the invention, the insulator 310 is formed using a portion of a color filter layer that also forms the color filter 160. The color filter layer includes a red color filter layer 162a, a green color filter layer 164a and a blue color filter layer 166a. The red, green and blue color filter layers 162a, 164a and 166a formed in the first peripheral area PA1 are formed at the same time the color filter 160 is formed in the first display area DA1.

Particularly, the red color filter layer 162a is formed at the same time the red color filter 162 is formed in the first display area DA1. The green color filter layer 164a is formed on the red color filter layer 162a at the same time the green color filter 164 is formed in the first display area DA1. The blue color filter layer 166a is formed on the green color filter layer 164a at the same time the blue color filter 166 is formed in the first display area DA1.

The insulator 310 having the red, green and blue color filter layers 162a, 164a and 166a has a thickness substantially equal to a distance between the first and second substrates 100 and 200.

The conductor 129a covers the insulator 310 formed in the first peripheral area PA1 and is insulated from the pixel electrode 129 formed at the first display area DA1. The conductor 129a comprises a transparent conductive material, such as, for example, ITO or IZO. The conductor 129a may be simultaneously formed with the pixel electrode 129.

Referring to FIG. 16, the second substrate 200 includes a second transparent substrate 210 and a common electrode 220. The second transparent substrate 200 may further include a black matrix 240.

The second transparent substrate 210 faces the first transparent substrate 110 and includes a second display area DA2 and a second peripheral area PA2 surrounding the second display area DA2. The second display area DA2 and second peripheral area PA2 face the first display area DA1 and first peripheral area PA1 of the first substrate 100, respectively. The common electrode 220 is formed in the second display area DA2 and partially extends into the second peripheral area PA2. The extended portion of the common electrode 220 is connected to the conductor 129a of the power-applying member 300 placed in the first peripheral area PA1 of the first substrate 100.

The black matrix 240 having a lattice-shape is formed between the second transparent substrate 210 and common electrode 220 to block light from leaking between the pixel electrode 219 and an adjacent pixel electrode. The black matrix 240 is made of, for example, a chromium layer, a double-layer having a chromium layer and a chromium oxide layer, or a black organic layer having a light transmittance substantially equal to that of chromium Cr.

A sealing member 410 having a band shape is formed at a boundary between the first peripheral area PA1 and first display area DA1 of the first substrate 100 or at a boundary between the second peripheral area PA2 and second display area DA2 of the second substrate 200. The liquid crystal 400 is dropped into the first display area DA1 or second display area DA2 surrounded by the sealing member 410, and then the first substrate 100 is assembled with the second substrate 200. Alternatively, the liquid crystal 400 may be injected between the first and second substrates 100 and 200 after the first and second substrates 100 and 200 are assembled with each other using the sealing member 410. The conductor 129a of the first substrate 100 makes contact with the common electrode 220 of the second substrate 200 after the first substrate 100 and the second substrate 200 are assembled together.

According to this exemplary embodiment of the invention, the insulator 310 and conductor 129a are formed in the first peripheral area PA1 of the first substrate 100 and the color filter 160 is formed in the first display area DA1 of the first substrate 100 to provide the common voltage applied to the first substrate to the common electrode 220 through the conductor 129a. Thus, the manufacturing processes for the LCD apparatus 600 may be simplified. Also, since the LCD apparatus 600 does not use a gold (Au) spacer, the LCD apparatus 600 may be manufactured at a lower cost.

Figure 17:
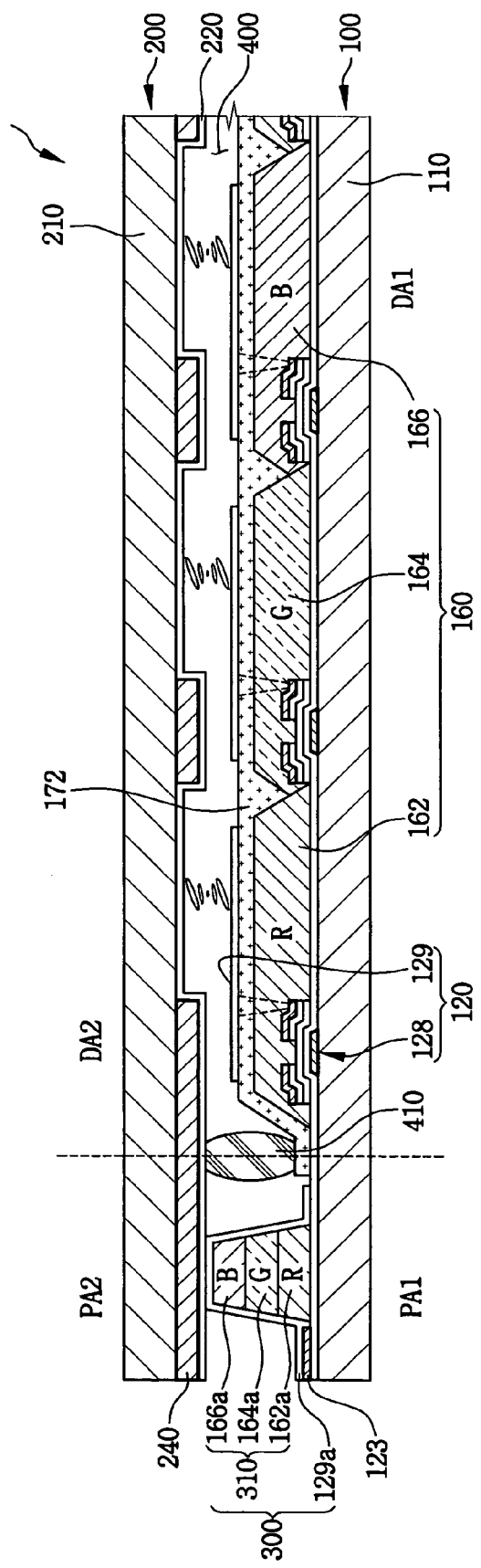
FIG. 17 is a cross-sectional view of an LCD apparatus according to another exemplary embodiment of the present invention.

FIG. 17 is a cross-sectional view of an LCD apparatus according to another exemplary embodiment of the present invention. In FIG. 17, the same reference numerals denote the same elements in FIG. 16, and thus the detailed descriptions of the same elements will be omitted.

Referring to FIG. 17, a transparent planarizing layer 172 is formed over a first transparent substrate 110 of the first substrate 100 to improve step coverage of a color filter 160 formed at a first substrate 100. A portion of the planarizing layer 172 that covers an insulator 310 formed in a first peripheral area PA1 is removed by a photolithography process. Thus, a distance between a pixel electrode 129 and a gate bus line 121 and between the pixel electrode 129 and a data bus line 122 of the LCD apparatus is increased, thereby improving display quality of an image.

According to this exemplary embodiment of the invention, the insulator 310 and the conductor 129a are formed in the first peripheral area PA1 of the first substrate 100 and the color filter 160 is formed in the first display area DA1 of the first substrate 100 to provide the common voltage applied to the first substrate 100 to the common electrode 220 of the second substrate 200 through the conductor 129a. Thus, the manufacturing processes for the LCD apparatus 600 is simplified and the LCD apparatus 600 may be manufactured at a lower cost since the LCD apparatus 600 does not use a gold (Au) spacer. Also, the color filter 160 and the common electrode 220 of the LCD apparatus 600 have improved step coverage.

Figure 18:
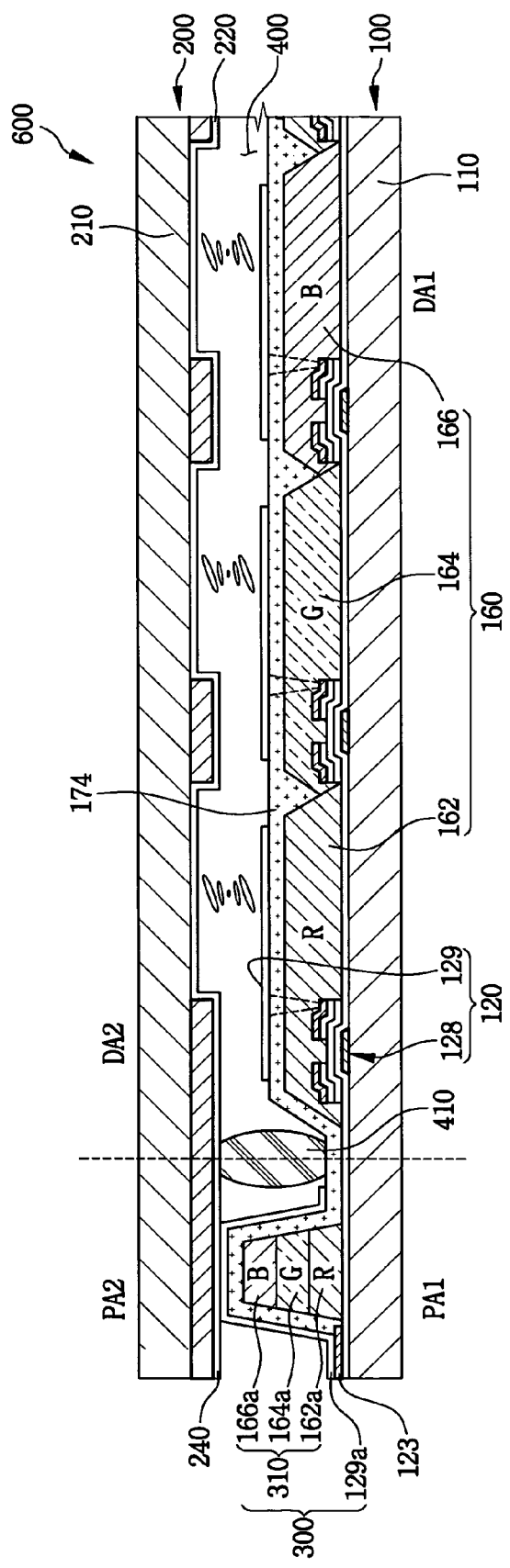
FIG. 18 is a cross-sectional view of an LCD apparatus according to another exemplary embodiment of the present invention.

FIG. 18 is a cross-sectional view of an LCD apparatus according to another exemplary embodiment of the present invention. In FIG. 18, the same reference numerals denote the same elements in FIG. 16, and thus the detailed descriptions of the same elements will be omitted.

Referring to FIG. 18, a transparent planarizing layer 174 is formed over a first transparent substrate 110 of the first substrate 100 to improve step coverage of a color filter 160 formed at a first substrate 100. If the total thickness of a conductor 129a and an insulator 310 is smaller than a cell gap between the first and second substrates 100 and 200, the planarizing layer 174 may be formed over the color filter 160 and the insulator 310. In this exemplary embodiment of the invention, the planarizing layer 174 is formed between the color filter 160 and the pixel electrode 129, so that the conductor 129a is electrically connected to a common electrode 220 of the second substrate 200.

According to this exemplary embodiment of the invention, the insulator 310 and the conductor 129a are formed in the first peripheral area PA1 of the first substrate 100 and the color filter 160 is formed in the first display area DA1 of the first substrate 100 to provide the common voltage applied to the first substrate 100 to the common electrode 220 of the second substrate 200 through the conductor 129a. Thus, the manufacturing processes for the LCD apparatus 600 is simplified and the LCD apparatus 600 may be manufactured at a lower cost since the LCD apparatus does not use a gold (Au) spacer. Also, the color filter 160 and the common electrode 220 of the LCD apparatus 600 have improved step coverage. Furthermore, the planarizing layer 174 is formed between the color filter 160 and the pixel electrode 129 and between the insulator 310 and conductor 129a, thereby electrically connecting the conductor 129a formed in the first peripheral area PA1 of the first substrate 100 to the common electrode 220 of the second substrate 200.

Figure 19:
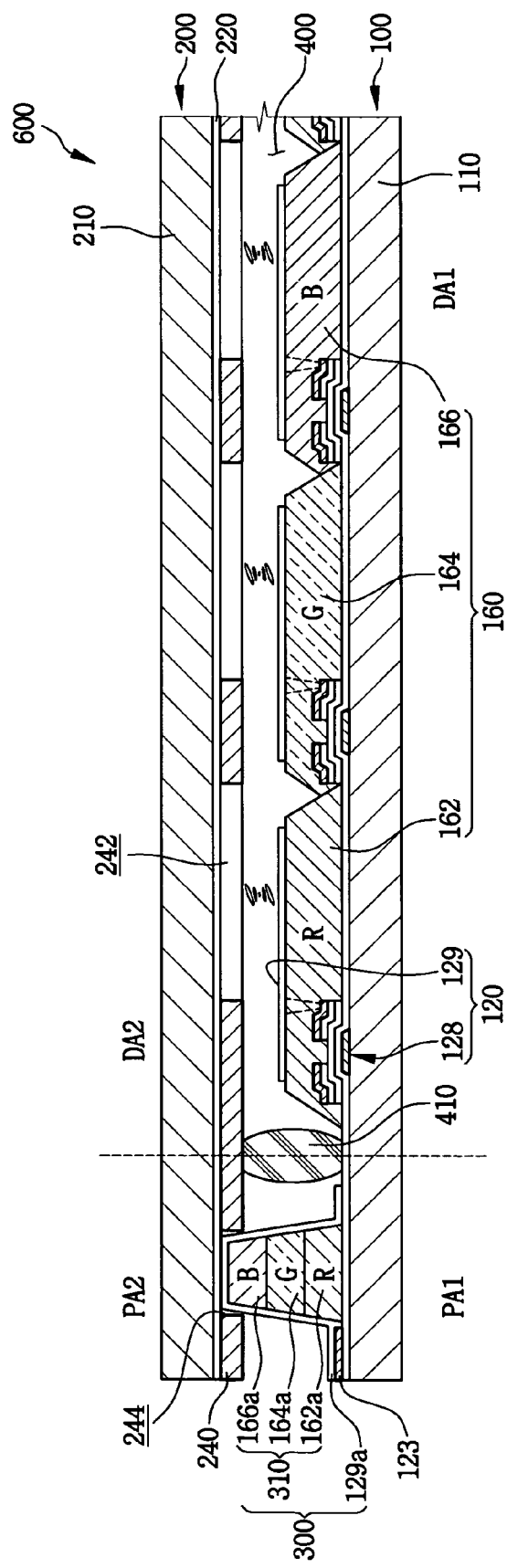
FIG. 19 is a cross-sectional view of an LCD apparatus according to another exemplary embodiment of the present invention.

FIG. 19 is a cross-sectional view of an LCD apparatus according to another exemplary embodiment of the present invention. In FIG. 19, the same reference numerals denote the same elements in FIG. 16, and thus the detailed descriptions of the same elements will be omitted.

Referring to FIG. 19, a common electrode 220 is formed between a second transparent substrate 210 and a black matrix 240. This structure prevents deterioration of display quality of an image due to an electric field caused by bad step coverage of the common electrode 220 formed on the black matrix 240. The black matrix 240 has an opening 244 formed at a position corresponding to a conductor 129a wrapping an insulator 310. The conductor 129a makes contact with the common electrode 220 through the opening 244 formed in the black matrix 240.

According to this exemplary embodiment of the invention, the insulator 310 and the conductor 129a are formed in the first peripheral area PA1 of the first substrate 100 and the color filter 160 is formed in the first display area DA1 of the first substrate 100 to provide the common voltage applied to the first substrate 100 to the common electrode 220 of the second substrate 200 through the conductor 129a. Thus, the manufacturing processes for the LCD apparatus 600 is simplified and the LCD apparatus 600 may be manufactured at a lower cost since the LCD apparatus does not use a gold (Au) spacer. Also, the LCD apparatus 600 may prevent deterioration of the display quality of the image due to the electric field caused by the black matrix 240.

Figure 20:
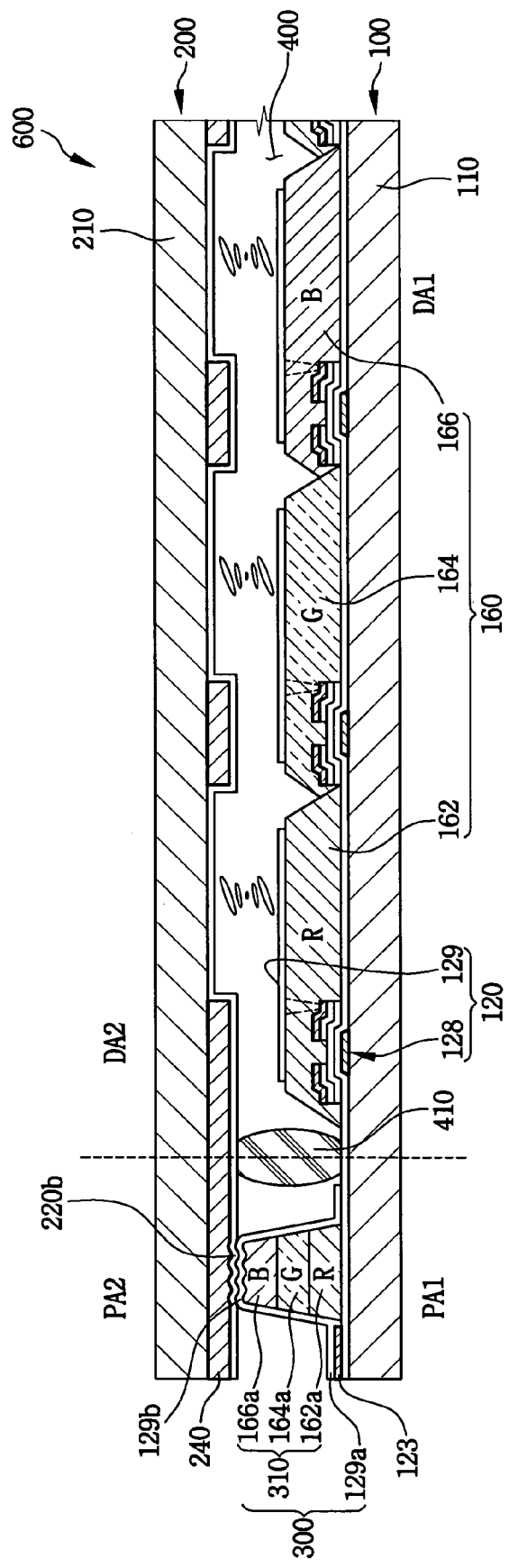
FIG. 20 is a cross-sectional view of an LCD apparatus according to another exemplary embodiment of the present invention.

FIG. 20 is a cross-sectional view of an LCD apparatus according to another exemplary embodiment of the present invention. In FIG. 20, the same reference numerals denote the same elements in FIG. 16, and thus the detailed descriptions of the same elements will be omitted.

Referring to FIG. 20, a conductor 129a formed in a first peripheral area PA1 of a first substrate 100 includes a first concavo-convex portion 129b that makes contact with a common electrode 220 formed in a second peripheral area PA2 of a second substrate 200. The common electrode 220 includes a second concavo-convex portion 220b that makes contact with the conductor 129a. The first concavo-convex portion 129b is formed by a slit-exposure method at the same time a color filter 160 is formed, and the second concavo-convex portion 220b is formed by a slit-exposure method at the same time a black matrix 240 is patterned.

Although the total thickness of the conductor 129a and an insulator 310 is different from a distance between the first and second substrates 100 and 200, the conductor 129a may make contact with the common electrode 220 by the first and second concavo-convex portions 129b and 220b, thereby applying a common voltage applied to the first substrate to the common electrode 220 of the second substrate 200.

According to this exemplary embodiment of the invention, the insulator 310 and the conductor 129a are formed in the first peripheral area PA1 of the first substrate 100 and the color filter 160 is formed in the first display area DA1 of the first substrate 100 to provide the common voltage applied to the first substrate 100 to the common electrode 220 of the second substrate 200 through the conductor 129a. Thus, the manufacturing processes for the LCD apparatus 600 is simplified and the LCD apparatus 600 may be manufactured at a lower cost since the LCD apparatus does not use a gold (Au) spacer. Also, although the total thickness of the conductor 129a and insulator 310 is different from the distance between the first and second substrates 100 and 200, the conductor 129a may make contact with the common electrode 220.

Figure 21:
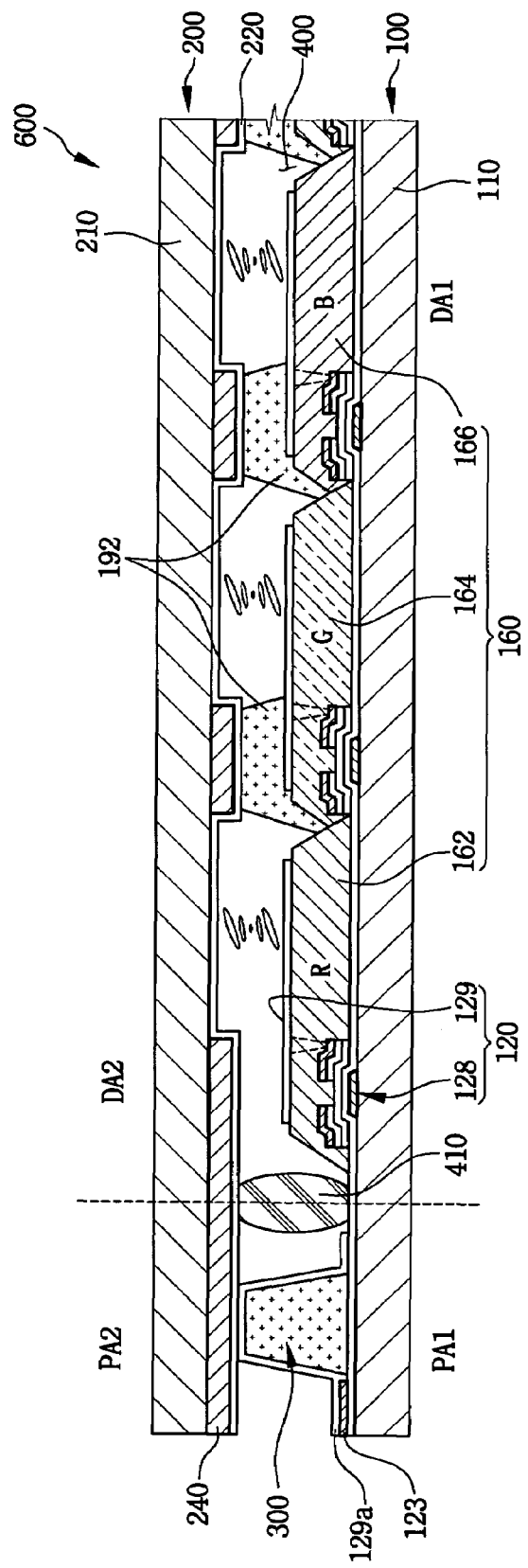
FIG. 21 is a cross-sectional view of an LCD apparatus according to another exemplary embodiment of the present invention.

FIG. 21 is a cross-sectional view of an LCD apparatus according to another exemplary embodiment of the present invention. In FIG. 21, the same reference numerals denote the same elements in FIG. 16, and thus the detailed descriptions of the same elements will be omitted.

Referring to FIG. 21, a spacer 192 having a pole shape is formed in a first display area DA1 of a first substrate 100 or in a second display area DA2 of a second substrate 200. In this exemplary embodiment of the invention, the spacer 192 is formed in the first display area DA1 of the first substrate 100. The spacer 192 is formed between a pixel electrode 129 and an adjacent pixel electrode to maintain a cell gap between the first and second substrates 100 and 200.

An insulator 300 is formed in a first peripheral area PA1 of the first substrate 100 and in a second peripheral area PA2 of the second substrate 200. The insulator 300 is formed at the same time the spacer 192 is formed at the first and second display areas DA1 and DA2. A conductor 129a is formed on the insulator 300 so as to apply a common voltage applied to the first substrate 100 to a common electrode 220 of the second substrate 200.

According to this exemplary embodiment of the invention, the spacer 192 for maintaining the cell gap between the first and second substrates 100 and 200 is used as an insulator while the first and second substrates 100 and 200 are manufactured. The conductor 129a formed on the insulator 300 applies the common voltage applied to the first substrate 100 to the common electrode 220 of the second substrate 200. Thus, the manufacturing processes for the LCD apparatus 600 is simplified and the LCD apparatus 600 may be manufactured at a lower cost since the LCD apparatus does not use a gold (Au) spacer.

In various exemplary embodiments of the present invention, the common voltage applied to the first substrate is applied to the common electrode of the second substrate using an insulator formed by patterning the color filter layer and a conductor formed on the insulator. The common voltage applied to the first substrate may also be provided to the common electrode of the second substrate using a spacer formed by patterning the color filter layer.

While the present invention has been described in detail with reference to the preferred embodiments, it is to be understood that the invention is not limited to the disclosed embodiments, but, on the contrary, is intended to cover various modifications and equivalent arrangements included within the sprit and scope of the appended claims.

What is claimed is:

1. A liquid crystal display device, comprising:
a first substrate;
a common electrode formed over the first substrate;
a second substrate disposed opposite the first substrate;
a plurality of pixel electrodes formed over the second substrate;
a common voltage applying member that applies a common voltage to the common electrode and that maintains a cell gap between the first substrate and the second substrate, the common voltage-applying member comprising an insulator and a conductor formed over the insulator;
a color filter formed over the second substrate; and
a black matrix formed over the first substrate, wherein:
the common voltage applying member is disposed between a first peripheral area of the first substrate and a second peripheral area of the second substrate, the first and second peripheral areas being outside display areas of the first and second substrates, the conductor is insulated from the pixel electrodes, the plurality of pixel electrodes are formed of the same material as the conductor, the color filter is formed of the same material as the insulator, the black matrix is formed over the common electrode, and the conductor contacts the common electrode through an opening in the black matrix.

2. A liquid crystal display device, comprising:

a first substrate;

a common electrode formed over the first substrate;

a second substrate disposed opposite the first substrate;

a plurality of pixel electrodes formed over the second substrate;

a common voltage applying member that applies a common voltage to the common electrode and that maintains a cell gap between the first substrate and the second substrate, the common voltage-applying member comprising an insulator and a conductor formed over the insulator; and a color filter formed over the second substrate, wherein:

the common voltage applying member is disposed between a first peripheral area of the first substrate and a second peripheral area of the second substrate, the first and second peripheral areas being outside display areas of the first and second substrates, the conductor is insulated from the pixel electrodes, the plurality of pixel electrodes are formed of the same material as the conductor, the color filter is formed of the same material as the insulator, and a concavo-convex portion of the conductor is in contact with a corresponding concavo-convex portion of the common electrode.

3. A liquid crystal display device, comprising:

a first substrate;

a common electrode formed on the first substrate;

a second substrate disposed opposite the first substrate;

a plurality of pixel electrodes formed over the second substrate;

a common voltage applying member that applies a common voltage to the common electrode and that maintains a cell gap between the first substrate and the second substrate, the common voltage-applying member comprising an insulator and a conductor formed over the insulator; and a black matrix formed on the common electrode, wherein:

part of the conductor is sandwiched between the insulator and the common electrode, the common voltage applying member is disposed outside display areas of the first and second substrates, the conductor is insulated from the pixel electrodes, and the conductor contacts the common electrode through an opening in the black matrix.

4. A liquid crystal display device, comprising:

a first substrate;

a common electrode formed on the first substrate;

a second substrate disposed opposite the first substrate;

a plurality of pixel electrodes formed over the second substrate; and a common voltage applying member that applies a common voltage to the common electrode and that maintains a cell gap between the first substrate and the second substrate, the common voltage-applying member comprising an insulator and a conductor formed over the insulator, wherein:

part of the conductor is sandwiched between the insulator and the common electrode, the common voltage applying member is disposed outside display areas of the first and second substrates, the conductor is insulated from the pixel electrodes, and a concavo-convex portion of the conductor is in contact with a corresponding concavo-convex portion of the common electrode.

5. A liquid crystal display device, comprising:

a first substrate;

a common electrode formed on the first substrate;

a second substrate disposed opposite the first substrate;

a common voltage applying member that applies a common voltage to the common electrode and that maintains a cell gap between the first substrate and the second substrate, the common voltage-applying member comprising an insulator and a conductor formed over the insulator, wherein part of the conductor is sandwiched between the insulator and the common electrode; and a black matrix formed on the common electrode, wherein the conductor contacts the common electrode through an opening in the black matrix.

* * * * *

UNITED STATES PATENT AND TRADEMARK OFFICE
CERTIFICATE OF CORRECTION

| | |
|---|---|
| PATENT NO. | : 7,405,798 B2 |
| APPLICATION NO. | : 10/768333 |
| DATED | : July 29, 2008 |
| INVENTOR(S) | : Young-Hoon Yoo et al. |

Page 1 of 1

It is certified that error appears in the above-identified patent and that said Letters Patent is hereby corrected as shown below:

On the title page, item [30], the Foreign Application Priority Date should read:

May 15, 2003 (KR) 10-2003-0030790.

Signed and Sealed this

Twenty-first Day of October, 2008

JON W. DUDAS
*Director of the United States Patent and Trademark Office*